(12) United States Patent
Ritter et al.

(10) Patent No.: US 12,239,052 B2
(45) Date of Patent: Mar. 4, 2025

(54) CONTROL SYSTEM FACILITATING UNLOADING DURING CROP BREAKTHROUGH HARVESTING

(71) Applicant: Deere & Company, Moline, IL (US)

(72) Inventors: Aaron S. Ritter, Milan, IL (US); Corwin M. Puryk, Bettendorf, CA (US); Bradley K. Yanke, Eldridge, IA (US)

(73) Assignee: Deere & Company, Moline, IL (US)

( * ) Notice: Subject to any disclaimer, the term of this patent is extended or adjusted under 35 U.S.C. 154(b) by 251 days.

(21) Appl. No.: 17/875,974

(22) Filed: Jul. 28, 2022

(65) Prior Publication Data

US 2024/0032474 A1 Feb. 1, 2024

(51) Int. Cl.
*G05D 1/00* (2024.01)
*A01D 90/10* (2006.01)

(52) U.S. Cl.
CPC .................... *A01D 90/10* (2013.01)

(58) Field of Classification Search
CPC .. A01D 90/10; A01D 41/1278; A01D 41/127; G05D 2105/15; G05D 2107/21; G05D 2109/10; G05D 1/695; G05D 1/00; A01B 69/008; A01B 79/005
USPC ......................................................... 701/50
See application file for complete search history.

(56) References Cited

U.S. PATENT DOCUMENTS

| 7,034,666 | B2 | 4/2006 | Knutson |
| 8,544,574 | B2 | 10/2013 | Fegley et al. |
| 10,754,342 | B2 | 8/2020 | Tomita et al. |
| 2012/0215394 | A1 | 8/2012 | Wang et al. |
| 2013/0019580 | A1 | 1/2013 | Anderson et al. |
| 2013/0022430 | A1 | 1/2013 | Anderson et al. |
| 2014/0311113 | A1 | 10/2014 | Bonefas |
| 2017/0147005 | A1* | 5/2017 | Ramm ................ G05D 1/0295 |
| 2020/0064144 | A1* | 2/2020 | Tomita ................ A01B 79/005 |
| 2020/0128740 | A1* | 4/2020 | Suleman ................ A01D 57/06 |
| 2020/0133262 | A1 | 4/2020 | Suleman et al. |
| 2020/0319632 | A1 | 10/2020 | Desal et al. |
| 2021/0195840 | A1 | 7/2021 | Puryk et al. |

(Continued)

FOREIGN PATENT DOCUMENTS

| EP | 2548431 | | 1/2013 |
| EP | 3815486 | A1 | 5/2021 |
| WO | 14046685 | A1 | 3/2014 |

OTHER PUBLICATIONS

Extended European Search Report and Written Opinion issued in European Patent Application No. 23183882.2, dated Dec. 22, 2023, in 08 pages.

*Primary Examiner* — Shardul D Patel
(74) *Attorney, Agent, or Firm* — Christopher J. Volkmann; Kelly, Holt & Christenson, PLLC

(57) ABSTRACT

A control system controls the operation of a harvester and/or receiving vehicle so that the receiving vehicle can travel adjacent the harvester, behind a harvesting head on the harvester, during a breakthrough pass in the harvesting operation. The control system can include an interlock system which generates an interlock signal when unloading during breakthrough harvesting is not desired. The control signal can include a monitoring system that generates a control signal during the breakthrough pass, and a logistics system that identifies a desired location for the breakthrough pass.

20 Claims, 18 Drawing Sheets

(56) References Cited

U.S. PATENT DOCUMENTS

2021/0333802 A1\* 10/2021 Singh .................... B60W 10/04
2022/0018955 A1\* 1/2022 Christiansen ........ A01D 43/073

\* cited by examiner

CONTROL SYSTEM FACILITATING UNLOADING DURING CROP BREAKTHROUGH HARVESTING

FIELD OF THE DESCRIPTION

The present description relates to agricultural harvesters. More specifically, the present description relates to machine control in performing breakthrough harvesting.

BACKGROUND

There is a wide variety of different types of agricultural machines. Some such machines include harvesters, such as combine harvesters. Combine harvesters may often be fitted with different heads for harvesting different types of crops, such as corn or other row crops, wheat or other grains, etc.

Such harvesters include a clean grain tank where harvested material resides until it is unloaded from the harvester. During unloading, the harvester often includes an auger or other grain moving mechanism that moves the grain from the clean grain tank, out through a spout, and into a receiving vehicle that is adjacent, or closely proximate, the harvester. The receiving vehicle may be a grain cart towed by a towing vehicle, such as a tractor. The receiving vehicle may be a truck, or other receiving vehicle.

At times, the harvester unloads the grain from the clean grain tank into the receiving vehicle, as the harvester continues to harvest the field. In such an example, the receiving vehicle pulls along side the harvester so that the receiving vehicle is positioned under the spout, to receive the harvested material, from the harvester, through the spout, as the harvesting operation continues.

The discussion above is merely provided for general background information and is not intended to be used as an aid in determining the scope of the claimed subject matter.

SUMMARY

A control system controls the operation of a harvester and/or receiving vehicle so that the receiving vehicle can travel adjacent the harvester, behind a harvesting head on the harvester, during a breakthrough pass in the harvesting operation. The control system can include an interlock system which generates an interlock signal when unloading during breakthrough harvesting is not desired. The control signal can include a monitoring system that generates a control signal during the breakthrough pass, and a logistics system that identifies a desired location for the breakthrough pass.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
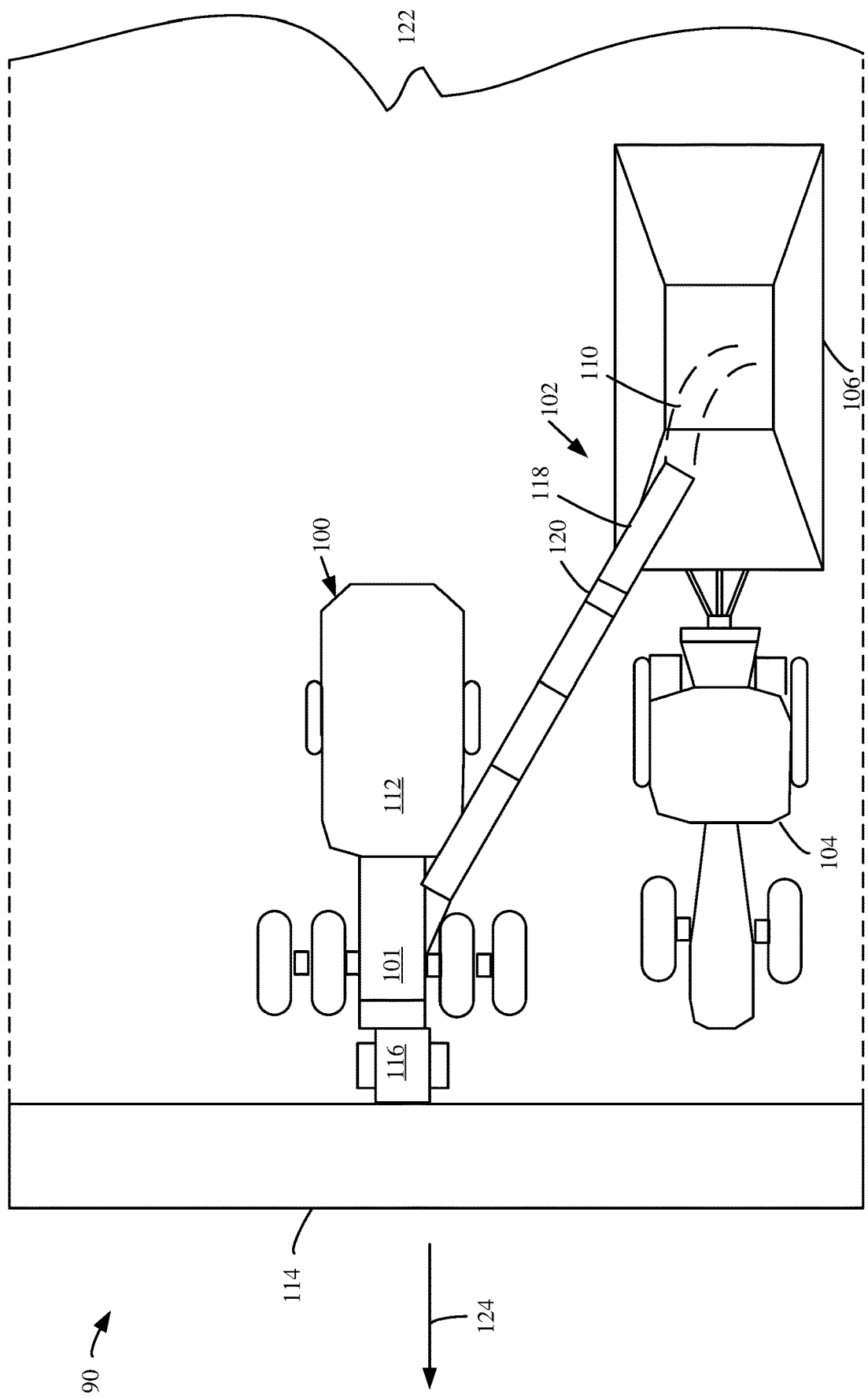
FIG. 1 is a pictorial illustration of an agricultural system performing a breakthrough pass during harvesting.

As discussed above, a harvester often unloads grain from its clean grain tank during a harvesting operation. When that happens, the receiving vehicle (e.g., a tractor pulling a grain cart, etc.) drives along with the harvester, positioning a grain receiving vessel (e.g., the grain cart) under the spout of the harvester to receive unloaded grain, as the harvester moves through the field and continues to harvest crop. Often, the field to one side of the harvester is harvested and the receiving vehicle travels in the harvested area, alongside the harvester. The spout is positioned outwardly from the harvester, perpendicular, or closely proximate to perpendicular, to the direction of travel.

It can be difficult for the two vehicles to maintain a desired spacing during this harvesting/unloading operation. To maintain desired spacing, the driver of the receiving vehicle often moves alongside the harvester, and the harvester unloads grain or other harvested material into the receiving vehicle, as both vehicles continue to drive. This, however, can present problems. For instance, in some cases when the harvester approaches an unharvested section of the field, the harvester must perform a breakthrough harvesting pass. A breakthrough pass creates an initial path through crop that is not adjacent to any other path. Thus, in some instances, standing crop is present on both sides of the initial path. In other instances, obstacles may be present on one side of the path, such as trees, a fence, a road, or other boundary. There has normally been insufficient room for the receiving vehicle to travel alongside the harvester during the breakthrough pass. This is because the receiving vehicle is unable to travel alongside the harvester (e.g., so the grain cart can receive grain from the harvester) without driving over unharvested crop or without coming into contact with obstacles.

Therefore, during the breakthrough pass, it is not uncommon for the receiving vehicle to wait until the harvester finishes the breakthrough pass in order to pull alongside the harvester for unloading. In another example, the harvester may also stop harvesting when the clean grain tank is nearly full, then backup, and harvest off to one side of the breakthrough pass and stop. That gives the receiving vehicle room to pull up adjacent the harvester for unloading. In such a scenario, the harvester remains stopped or in a stationary position, during the unloading process and then backs up and resumes harvesting after unloading is complete.

Also, harvester heads are increasing in width and, as a result, the harvester often fills its clean grain tank prior to completing the breakthrough pass. Therefore, the unloading operation can result in wasted time and thus reduced productivity during the harvesting operation.

The present description thus proceeds with respect to a control system in which the harvester and/or receiving vehicle can be controlled so that the receiving vehicle can be in close enough proximity to the harvester that the receiving vehicle drives behind the head of the harvester so that the receiving vehicle does not drive over unharvested crop. In this way, the harvester can continue harvesting, while unloading, even during the breakthrough pass. This increases the efficiency and accuracy of the machine control during the unloading process, and thus increases efficiency and productivity during the harvesting operation.

FIG. 1 is a pictorial illustration showing one example of a combine harvester 100 filling a receiving vehicle 102. FIG. 1 illustrates an unloading operation during breakthrough harvesting. Receiving vehicle 102 includes a tractor 104 that is pulling a grain cart 106. Cart 106 thus defines an interior that forms a receiving vessel for receiving harvested material 110 from a clean grain tank 112 in harvester 100. Briefly, in operation, harvester 100 includes an operator compartment 101 and a header 114 which engages unharvested crop as the harvester 100 moves through a field in the direction indicated by arrow 124. The crop is severed by a cutter on header 114 and is moved to a feeder house 116 where the crop is transported into further material handling systems (such as a thresher, cleaning subsystem, etc.) until the grain ends up in clean grain tank 112. An unloading auger moves the clean grain through spout 118 and into grain cart 106. In one example, a camera 120 captures an image (still or video image) of the receiving vessel in cart 106. An image processing system can process the image captured by camera 120 to identify the fill level within grain cart 106.

In some examples, harvester 100 may have an automatic fill control system that includes image processing, as discussed above. The automatic fill control system can receive a target landing point for the harvested material 110 in cart 106 and gauge the height of the harvested material 110 at the target landing point in cart 106. The automatic fill control system can control the operation of one or more of machines 100, 102, in order to accomplish a fill strategy such as a front-to-back fill strategy, a back-to-front fill strategy, etc. For example, if a front-to-back fill strategy is to be employed, then the automatic fill control system can control the relative position of machines 100 and 102 so that the spout 118 is first filling the receiving vessel at the front end of cart 106, and then gradually fills the receiving vessel moving rearward. In such an example, the harvester 100 and towing vehicle 104 illustratively have machine synchronization systems which communicate with one another to control the spatial offset between the two vehicles in order to accomplish the desired fill strategy. When the relative position of the two vehicles, relative to one another, is to change, then the machine synchronization system on the combine harvester 100 can send a message to the machine synchronization system on the towing vehicle 104 (or vice versa) to nudge the towing vehicle 104, for example, nudge the towing vehicle 104 slightly forward or rearward relative to the combine harvester 100 or nudge the towing vehicle 104 further away from or closer to the combine harvester (closer or farther laterally relative to the harvester 100), as desired. In other examples, the machine synchronization system on the towing vehicle 104 can send a message to the machine synchronization systems on the combine harvester 100 to change the relative spacing between the combine harvester 100 and the towing vehicle 104.

By way of example, the machine synchronization system on the combine harvester 100 may receive a signal from the fill control system on the combine harvester 100 indicating that the target landing point in the receiving vessel (e.g., grain cart 106) that is currently being filled is approaching its desired fill level. In that case, automatic fill control system on the combine harvester 100 can send a "nudge" signal to the machine synchronization system on the towing vehicle 104. The nudge, once received by the machine synchronization system on the towing vehicle 104, causes the towing vehicle 104 to momentarily speed up or slow down, thus nudging the position of the receiving vessel (e.g., grain cart 106) forward or rearward, respectively, relative to the combine harvester 100. In other examples, a nudge signal can be provided to the machine synchronization system on the towing vehicle 104 which causes the towing vehicle to adjust its lateral distance from the harvester 100. In some examples, nudges can be sent to the machine synchronization system on the towing vehicle to adjust both the lateral distance between the harvester 100 and the receiving machine 102 and the relative fore-to-aft positioning of the receiving machine 102 relative to the harvester 100.

In the example shown in FIG. 1, harvester 100 is performing a breakthrough pass, meaning that harvester 100 is harvesting a swath 122 in a section of the field where unharvested crop still resides on both sides of swath 122. It can be seen that header 114 is wide enough such that header 114 cuts swath 122 that is sufficiently wide that receiving vehicle 102 can travel side-by-side with combine harvester 100, while staying behind header 114 in the direction of travel (indicated by arrow 124) and close enough to combine harvester 100 that receiving vehicle 102 does not drive over any unharvested crops (outside of swath 122). As can be seen in FIG. 1, in unloading during breakthrough harvesting, the spout 118 of harvester 100 is pointed more rearwardly (as opposed to a more perpendicular projection relative to a direction of travel as would be the case in normal (or non-breakthrough harvesting) unloading) such that the receiving vehicle 104 can travel behind the header 114 while receiving harvested material. This also has the effect of shortening the lateral distance between the receiving vehicle 104 and harvester 100 as compared to the lateral distance in normal (or non-breakthrough harvesting) unloading. The machine synchronization systems on the two vehicles communicate with one another at a sufficiently high rate that the vehicles can be controlled to avoid collisions, and to avoid other problems, as is discussed in more detail below.

By way of example, one or both of the machines 100, 102 can include a synchronized machine operation control system, or such a system can be distributed between the machines, fully or partially deployed on a remote computing device or remote computing environment, such as a remote server environment (e.g., the Cloud), or distributed in other ways. The synchronized machine operation control system determines whether the worksite ahead of harvester 100 is suitable for controlling unloading during a breakthrough pass and, if not, generates an interlock indicating that such unloading should not be attempted. For example, the synchronized machine operation control system, in determining whether the worksite ahead of the harvester 100 is suitable for controlling unloading during a breakthrough pass, can consider characteristics of the worksite for example, topography, soil moisture, the directionality of the breakthrough pass, such as the straightness or the curvature, as well as various other characteristics. Similarly, the synchronized machine operation control system can determine where the breakthrough pass should be performed and whether unloading should be attempted, during the breakthrough pass, based on logistical criteria. Once unloading is being performed during the breakthrough pass, then a monitoring system also monitors the state of the vehicles and generates control signals based on the monitoring being performed. The synchronized machine operation control systems are discussed in greater detail below with respect to other Figures. Before continuing with such as description, a more detailed description of one example of a harvester 100 will first be provided.

Figure 2:
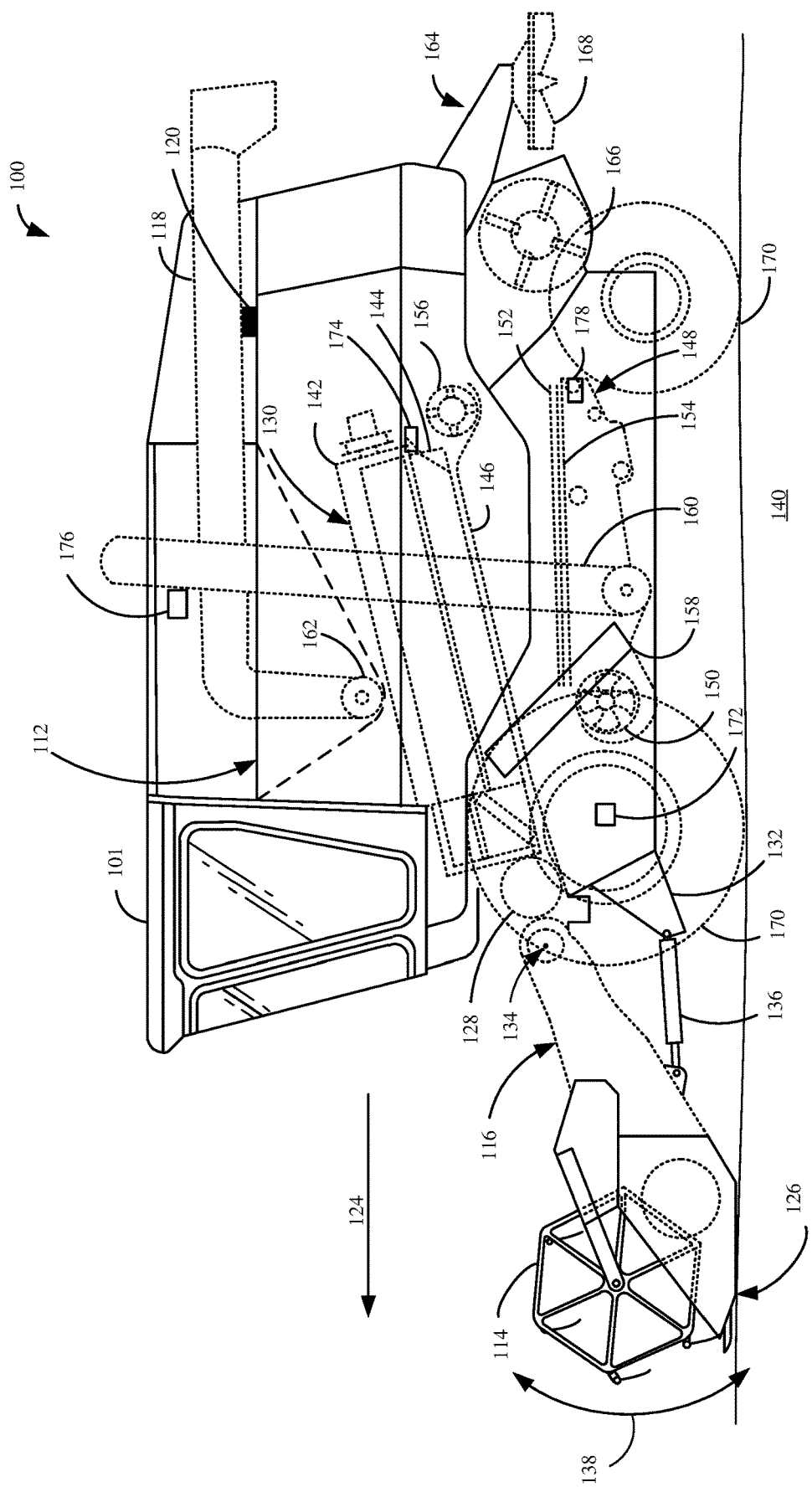
FIG. 2 is a pictorial illustration of one example of a harvester.

FIG. 2 is a partial pictorial, partial schematic, illustration of one example of an agricultural vehicle which is a self-propelled agricultural harvesting machine 100, in an example where machine 100 is a combine harvester (referred to, for example as harvester 100, or combine 100). It will be understood that FIG. 2 shows one example of a harvesting machine, and that in other examples other types or arrangements of harvesting machines can be used. For instance, FIG. 2 shows agricultural harvesting machine 100 as including a reel-type header, whereas in other examples, harvesting machine 100 could include a row unit type header, such as a corn header. In yet other examples, harvesting machine 100 could be another type of harvester, such as a cotton harvester. It can be seen in FIG. 2 that combine 100 illustratively includes an operator compartment 101, which can have a variety of different operator interface mechanisms, for controlling combine 100. Combine 100 can include a set of front end equipment that can include header 114, and a cutter generally indicated at 126. Combine 100 can also include a feeder house 116, a feed accelerator 128, and a thresher generally indicated at 130. Header 114 is pivotally coupled to a frame 132 of combine 100 along pivot axis 134. One or more actuators 136 drive movement of header 114 about axis 134 in the direction generally indicated by arrow 138. Thus, the vertical position of header 114 above ground 140 over which header 114 is traveling can be controlled by actuating actuator 136. While not shown in FIG. 2, it may be that the tilt (or roll) angle of header 114 or portions of header 114 can be controlled by a separate actuator. Tilt, or roll, refers to the orientation of header 114 about the front-to-back longitudinal axis of combine 100.

Thresher 130 illustratively includes a threshing rotor 142 and a set of concaves 144. Further, combine 100 can include a separator 146 that includes a separator rotor. Combine 100 can include a cleaning subsystem (or cleaning shoe) 148 that, itself, can include a cleaning fan 150, chaffer 152, and sieve 154. The material handling subsystem in combine 100 can include (in addition to a feeder house 116 and feed accelerator 128) discharge beater 156, tailings elevator 158, clean grain elevator 160 (that moves clean grain into clean grain tank 112) as well as unloading auger 162 and spout 118. Combine 100 can further include a residue subsystem 164 that can include chopper 166 and spreader 168. Combine 100 can also have a propulsion subsystem that includes an engine that drives ground engaging wheels 170 or tracks, etc. It will be noted that combine 100 may also have more than one of any of the subsystems mentioned above (such as left and right cleaning shoes, separators, etc.).

In operation, and by way of overview, combine 100 illustratively moves through a field in the direction indicated by arrow 124. As combine 100 moves, header 114 engages the crop to be harvested and gathers the crop to be harvested toward cutter 126. The operator illustratively sets a height setting for header 114 (and possibly a tilt or roll angle setting) and a control system controls actuator 136 (and possibly a tilt or roll actuator—not shown) to maintain header 114 at the set height above ground 140 (and at the desired roll angle). The control system responds to header error (e.g., the difference between the set height and measured height of header 114 above ground 140 and possibly roll angle error) with a responsiveness that is determined based on a set sensitivity level. If the sensitivity level is set high, the control system responds to, smaller header position errors, and attempts to reduce them more quickly than if the sensitivity is set lower.

After the crop is cut by cutter 126, the cut crop is moved through a conveyor in feeder house 116 toward feed accelerator 128, which accelerates the crop into thresher 130. The crop is threshed by rotor 142 rotating the crop against concaves 144. The threshed crop is moved by a separator rotor in separator 146 where some of the residue is moved by discharge beater 156 toward the residue subsystem 164. The residue can be chopped by residue chopper 166 and spread on the field by spreader 168. In other configurations, the residue is simply chopped and dropped in a windrow, instead of being chopped and spread.

Grain falls to cleaning shoe (or cleaning subsystem) 148. Chaffer 152 separates some of the larger material from the grain, and sieve 154 separates some of the finer material from the clean grain. Clean grain falls to an auger in clean grain elevator 160, which moves the clean grain upward and deposits it in clean grain tank 112. Residue can be removed from the cleaning shoe 148 by airflow generated by cleaning fan 150. Cleaning fan 150 directs air along an airflow path upwardly through the sieves and chaffers and the airflow carries residue can also be rearwardly in combine 100 toward the residue handling subsystem 164.

Tailings can be moved by tailings elevator 158 back to thresher 130 where they can be re-threshed. Alternatively, the tailings can also be passed to a separate re-threshing mechanism (also using a tailings elevator or another transport mechanism) where they can be re-threshed as well.

FIG. 2 also shows that, in one example, combine 100 can include ground speed sensor 172, one or more separator loss sensors 174, a clean grain camera 176, and one or more cleaning shoe loss sensors 178. Ground speed sensor 172 illustratively senses the travel speed of combine 100 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 178 illustratively provide an output signal indicative of the quantity of grain loss by both the right and left sides of the cleaning shoe 148. In one example, sensors 178 are impact sensors which count grain strikes per unit of time (or per unit of distance traveled) to provide an indication of the cleaning shoe grain loss. The impact sensors for the right and left sides of the cleaning shoe can provide individual signals, or a combined or aggregated signal. It will be noted that sensors 178 can comprise only a single sensor as well, instead of separate sensors for each shoe.

Separator loss sensor 174 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 174 may also comprise only a single sensor, instead of separate left and right sensors.

It will also be appreciated that sensor(s) and measurement mechanisms (in addition to the sensors already described) can include other sensors on combine 100 as well. For instance, the sensors can include a header height sensor that senses a height of header 114 above ground 140. Sensors can include stability sensors that sense oscillation or bouncing motion (and amplitude) of combine 100. Sensors can include a residue setting sensor that is configured to sense whether combine 100 is configured to chop the residue, drop a windrow, etc. The sensors can include cleaning shoe fan speed sensors that can be configured proximate fan 150 to sense the speed of the fan. The sensors can include a threshing clearance sensor that senses clearance between the rotor 142 and concaves 144. The sensors can include a threshing rotor speed sensor that senses a rotor speed of rotor 142. The sensors can include a chaffer clearance sensor that senses the size of openings in chaffer 152. The sensors can include a sieve clearance sensor that senses the size of openings in sieve 154. The sensors can include a material other than grain (MOG) moisture sensor that can be configured to sense the moisture level of the material other than grain that is passing through combine 100. These sensors can include grain moisture sensor that can be configured to sense the moisture level of the grain that is passing through combine 100. The sensors can include machine setting sensors that are configured to sense the various configurable settings on combine 100. The sensors can also include a machine orientation sensor that can be any of a wide variety of different types of sensors that sense the orientation of combine 100. Crop property sensors can sense a variety of different types of crop properties, such as crop type, crop size (e.g., stalk width), crop moisture, and other crop properties. The crop property sensors can also be configured to sense characteristics of the crop as they are being processed by combine 100. For instance, the crop property sensors can sense grain feed rate (e.g., mass flow rate), as it travels through clean grain elevator 160, or provide other output signals indicative of other sensed variables. Environment sensors can sense soil moisture, soil compaction, weather (which may be sensed or downloaded), temperature, standing water, and other properties of the soil, crop, machine or environment. Some additional examples of the types of sensors that can be used are described below.

Figure 3:
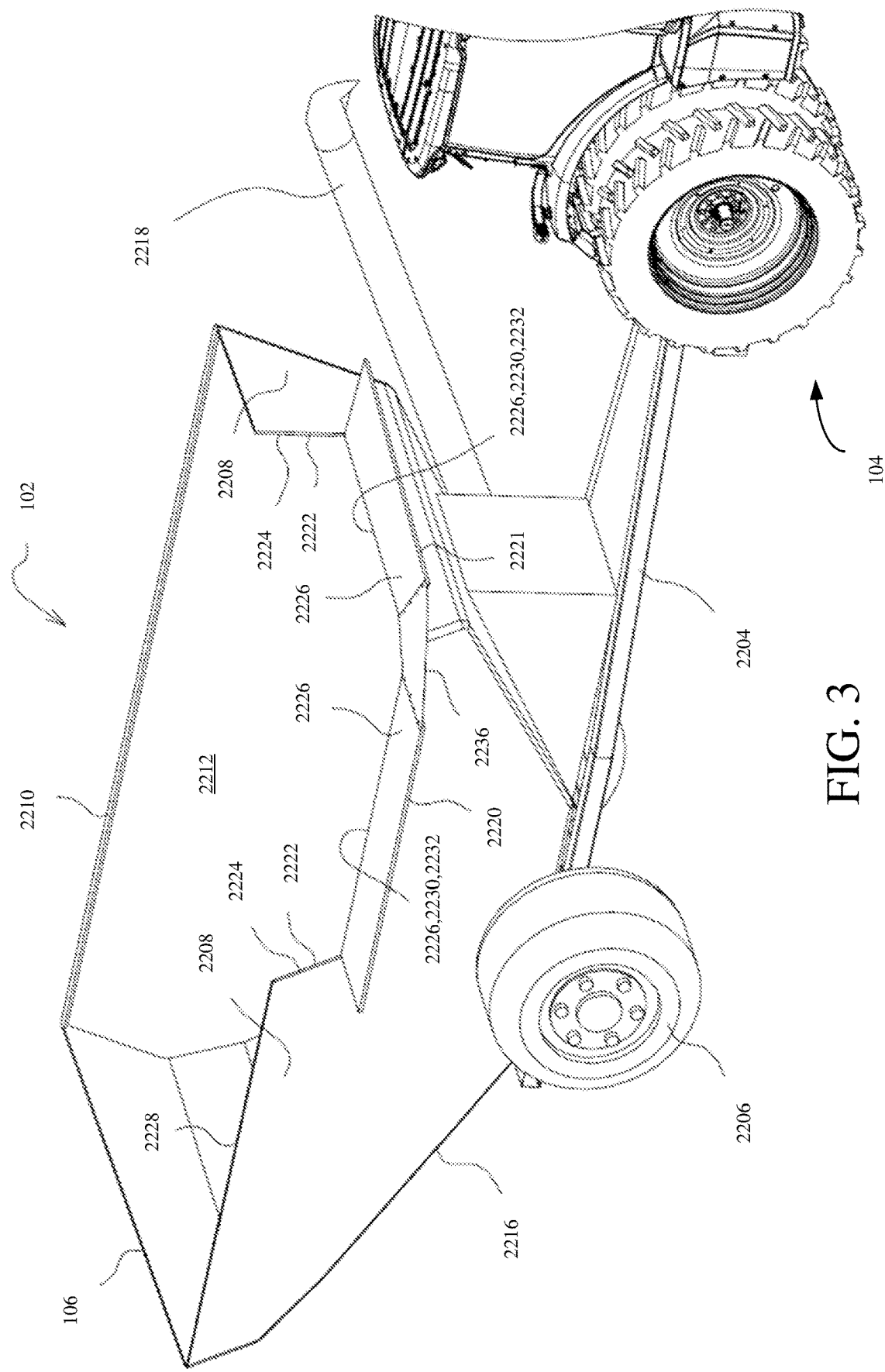
FIG. 3 is a perspective view of an example grain cart, according to some implementations of the present disclosure.

FIG. 3 is a perspective view of an example grain cart 106. Grain cart 106 includes a bin 2202 mounted on a frame 2204 and ground engaging elements 2206. In the illustrated example, the ground engaging elements 2206 include wheels and tires that roll to move the grain cart 106 over the ground. In other implementations, the ground engaging elements 2206 may be other devices, such as tracks, to move the grain cart 106 over the ground. In some instances, the grain cart 106 includes one or more scales to measure a weight or mass of harvested material, such as grain, deposited in the bin 2202.

The bin 2202 includes a plurality of walls 2208 and an open end 2210 that defines a perimeter of walls 2208 and an opening of grain cart 106. The bin 2202 defines a cavity 2212 that is open at the open end 2210. The open end 2210 allows for material, such as grain being unloaded from combine harvester 100, to be deposited in the cavity 2212. In some instances, the grain cart 106 may have a continuous wall that defines the cavity 2212. For example, the single wall may have a curved, continuous shape that, along with a floor, defines the cavity 2212. In other instances, the grain cart 106 may have a single continuous form that defines the lateral sides and based of the bin 2202. Thus, grain carts within the scope of the present disclosure may have different wall configurations that the examples shown in FIG. 3.

In the example illustrated in FIG. 3, the grain cart 106 includes four walls 2208 that have a tapered shape to define a hopper 2216 at a lower portion 2217 of the bin 2202. In other examples, the grain cart 106 may include a different number of walls, walls with different shapes, or both. The hopper 2216 funnels harvested material, such as grain, within the cavity to a conveyor 2218 used to unload the harvested material within the bin 2202.

Two of the walls 2208 include door 2220, 2221, respectively, that are movable between a closed position and an open position. FIG. 3 shows the doors 2220, 2221 in the open position. With the doors 2220, 2221 moved into the open position, and unloader of a combine harvester, such as spout 118 of combine harvester 100, can extend into the cavity 2212 of the bin 2202 to unload material. As described previously, in FIG. 1, during breakthrough harvesting unloading, the spout 118 of combine harvester 100 is pointed more rearwardly. In some examples, such as where the grain cart 106 is of a certain height, doors 2220, 2221 can be opened to accommodate spout 118 during breakthrough harvesting unloading.

Each of the walls 2208 define an opening 2222. The openings 2222 are adjacent to and extend from the open end 2210. In the illustrated example, the openings 2222 include a generally vertically extending edge 2224 and a generally horizontally extending edge 2226. In other implementations, edges having other shapes may define the openings 2222. The edge 2224 extends from an edge 2228 of the wall 2208 that defines, in part, the open end 2210. Thus, the openings 2222 define a notch in the respective walls 2208.

The doors 2220, 2221 are coupled to the respective walls 2208 via a hinged connection 2230. Thus, in the closed configuration, the doors 2220, 2221 are pivoted upwards about the horizontal axis 2232 so that the openings 2222 are covered. In the open position, the doors 2220, 2221 are pivoted downwards about the horizontal axis 2232 so that the openings 2222 are exposed.

Figure 4A:
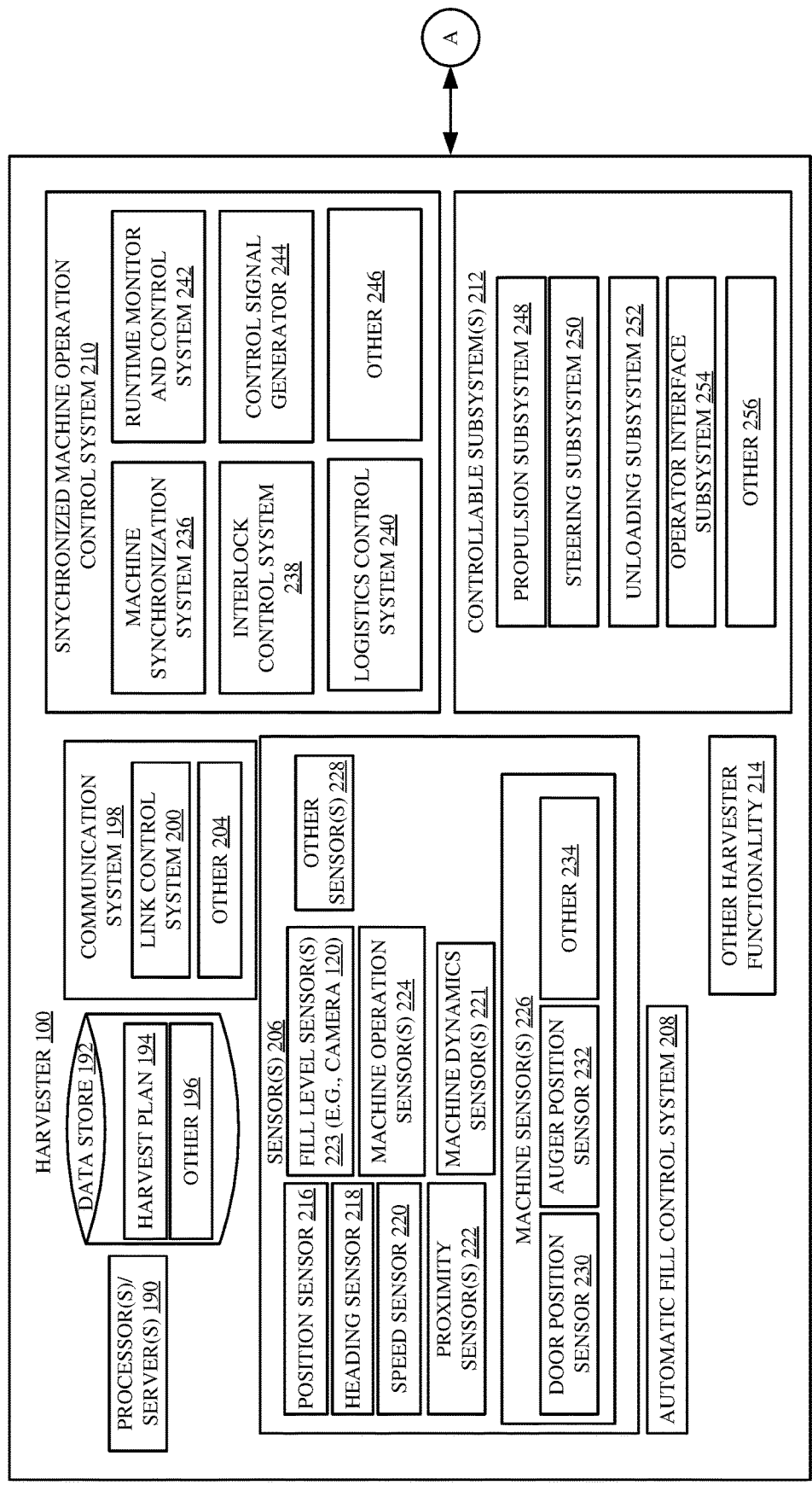
FIGS. 4A-4B (collectively referred to herein as FIG. 4) are a block diagram of one example of an agricultural system.
Figure 4B:
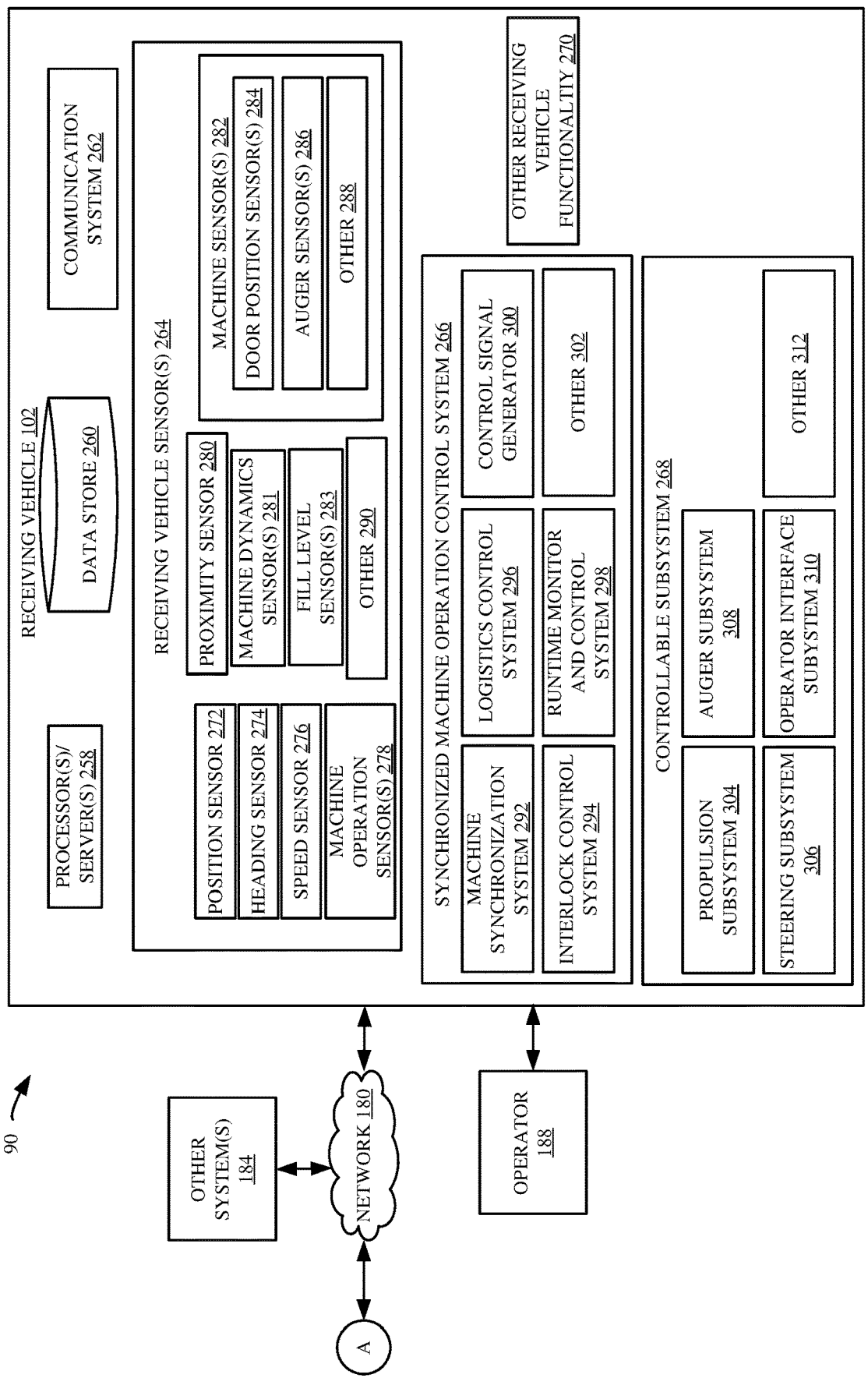

FIGS. 4A-4B (collectively referred to herein as FIG. 4) show a block diagram of one example of harvester 100 and receiving vehicle 102 with some additional items shown in more detail than in previous Figures. In the example shown in FIG. 4, harvester 100 and receiving vehicle 102 are shown in communication with one another over network 180. Harvester 100 and receiving vehicle 102 can also communicate with one or more other systems 184 over network 180. Network 180 can thus be a wide area network, a near field communication network, a local area network, a Bluetooth network, a Wi-Fi network, a cellular network, or any of a wide variety of other networks or combinations of networks. Other systems 184 can include farm manager systems, cloud-based systems, vendor systems, manufacturer systems, among others. It will be noted that while the example in FIG. 4 shows a single harvester 100 in communication with a receiving vehicle 102, in other examples, a plurality of harvesters 100 can be in communication with a plurality of receiving vehicles 102. In yet other examples, a single harvester 100 can be in communication with a plurality of receiving vehicles 102 or a plurality of harvesters 100 can be in communication with a single receiving vehicle 102. Various combinations of the number of machines are contemplated herein.

FIG. 4 also shows that operator 186 can operate harvester 100 while operator 188 can operate receiving vehicle 102. In other examples, either harvester 100 or receiving vehicle 102, or both, can be automatically operated, such as by a control system.

In the example shown in FIG. 4, harvester 100 includes one or more processors 190, data store 192 which can store one or more harvest plans 194 and other information 196 (e.g., logistical criteria data, input data for interlock control system 238 (interlock criteria), machine dimensionality data, maps, various data utilized by items in FIGS. 4-7, as well as various other data), communication system 198 (which can include link control system 200 and other items 204), as well as sensors 206, automatic fill control system 208, synchronized machine operation control system 210, controllable subsystems 212, and other harvester functionality 214. Sensors 206 can include position sensor 216, heading sensor 218, speed sensor 220, one or more machine dynamics sensors 221, one or more proximity sensors 222, fill level sensors 223 (such as camera 120 as well as other fill level sensors), machine operation sensors 224, other machine sensors 226, and other sensors 228. Other sensors 228 can include various other types of sensors, including, but not limited to, the various sensors described above with reference to FIG. 2. Other machine sensors 226 can include sensors that sense the configuration or state of the machine, such as door position sensor 230, auger or spout position sensor 232, and other machine sensors 234.

Synchronized machine operation system 210 can include machine synchronization system 236, interlock control system 238, logistics control system 240, runtime monitor and control system 242, control signal generator 244 and other items 246. Controllable subsystems 212 can include propulsion subsystem 248, steering subsystem 250, unloading subsystem 252, operator interface subsystem 254, and a wide variety of other subsystems 256.

Receiving vehicle 102 can include one or more processors 258, data store 260, communication system 262, receiving vehicle sensors 264, synchronized machine operation control system 266, controllable subsystems 268, and a wide variety of receiving vehicle functionality 270. Sensors 264 can include position sensor 272, heading sensor 274, speed sensor 276, machine operation sensors 278, proximity sensors 280, machine dynamics sensors 281, machine sensors 282 (which, themselves, can include such things as door position sensors 284, auger position sensors 286, and other machine sensors 288), fill level sensors 283, as well as other sensors 290. The synchronized machine operation control system 266 on receiving vehicle 102 can include machine synchronization system 292, interlock control system 294, logistics control system 296, runtime monitoring control system 298, control signal generator 300, and other items 302. Controllable subsystems 268 can include propulsion subsystem 304, steering subsystem 306, auger subsystem 308, operator interface subsystem 310, and other subsystems 312. Before describing the overall operation of harvester 100 and receiving vehicle 102 in more detail, a brief description of some of the items on vehicles 100 and 102, and their operation, will first be described.

Communication system 198 illustratively facilities communication among the items on harvester 100 and between harvester 100 and receiving vehicle 102 and other systems 184. Therefore, the particular functionality of communication system 198 may include a controller area network (CAN) bus and bus controller, and other communication functionality, that may depend on the type of network 180 over which system 198 communicates. In one example, link control system 200 establishes a link with communication system 262 on receiving vehicle 102 so that the two vehicles can communicate with one another in order to perform unloading during a breakthrough harvesting pass. For instance, the link may be established based on an input from operator 186 or operator 188. In another example, the link may automatically be established when the two vehicles 100 and 102 come into close proximity to one another. One of sensors 206 may sense the proximity of the two vehicles relative to one another and provide an output to link control system 200 to establish a link between the vehicles. In yet another example, the link may be established based on another sensor input, or another communication system input, or any of a wide variety of other criteria. Communication system 262 illustratively facilitates communication among the items on receiving vehicle 100 and between receiving vehicle 102 and harvester 100 and other systems 184.

Position sensor 216 may be a sensor that senses the geographic position of harvester 100 within a global coordinate system or a local coordinate system. The position sensor may be a global navigation satellite system (GNSS) receiver, a cellular triangulation system, a dead reckoning system, or any of a wide variety of other sensors that sense the geographic position of harvester 100. Heading sensor 218 may be a sensor, such as an accelerometer, an inertial measurement unit, a compass, or another type of sensor that senses the heading or direction of travel of harvester 100. Heading sensor 218 may also be computational logic that generates the heading based upon an input from another sensor. For instance, by detecting two temporally spaced outputs from position sensor 216, heading sensor 218 may identify the direction of travel of harvester 100 without separately sensing the heading of harvester 100.

Speed sensor 220 may be the same as speed sensor 172 discussed above with respect to FIG. 2 or it may be a different type of speed sensor. Speed sensor 220 may provide data indicative of wheel slip.

Machine dynamics sensors 221 may be sensor(s) that sense one or more of the pitch, roll, and yaw of harvester 100. Some examples of machine dynamics sensors 221 can include inertial measurement units (IMUs), accelerometers, gyroscopes, magnetometers, as well as various other types of sensors.

Proximity sensor 222 illustratively senses objects in a given proximity to harvester 100. Therefore, proximity sensor 222 may be a RADAR-based sensor, a LIDAR-based sensor, an optical sensor (such as a camera or an infrared sensor), an ultrasonic sensor, or any of a wide variety of other proximity sensors. The fill level sensor 223 may be camera 120 or another fill level sensor that senses the fill level of harvested material in the receiving vehicle 102. Additionally, fill level sensors 223 may also include sensors that detect the fill level of the on-board grain tank of harvester 100, such as mass flow sensors, weight sensors, imaging systems (e.g., cameras, such as a camera similar to camera 120 that observes the on-board grain tank), contact and non-contact sensors, as well as various other suitable sensors. Machine operation sensors 224 can be any of a wide variety of different types of sensors that sense the operation of different functionality on harvester 100. For instance, machine operation sensor 224 can be a sensor that senses the operational state of unloading subsystem 252 (such as whether the unloading auger 162 is operating, the position of the unloading auger 162, etc.). If unloading auger 162 stops working for some reason (such as shear bolts being broken or some other malfunction), then machine operation sensor 224 generates an output indicating that the unloading auger 162 has stopped working. Machine operation sensors 224 can include any of a wide variety of other sensors as well, for example, but not by limitation, an imaging system, such as a camera.

Other machine sensors 226 can sense characteristics of harvester 100 and generate other outputs as well. For instance, door position sensor 230 may sense whether actuatable (e.g., foldable) door(s) on the side of cart 106, such as doors 2220, 2221, are open or closed and generate an output signal indicative of the position of the door(s). The door(s) on cart 106, such as doors 2220, 2221, can be actuated (e.g., opened) during operation to allow the cart 106 to clear the unloading mechanism (e.g., spout 118 and unloading auger 162) of harvester 100, such as during breakthrough harvesting. For example, during breakthrough harvesting and unloading, the spout 118 is generally positioned such that it is pointed more rearwardly than in usual unloading circumstances (e.g., where the cart 106 is traveling to the side of the header, such as in a previously harvested adjacent pass). For example, in usual unloading circumstances (such as during unloading in non-breakthrough harvesting) the spout 118 is generally positioned more outwardly (or perpendicular to, or more perpendicular to, the direction of travel). The more rearward projection of the spout 118 during breakthrough harvesting unloading also causes the height of the spout 118 to be lower than if pointed more outwardly due to the nature of rotation of the unloading mechanism. The output signal indicative of the position of the door(s) may be helpful in determining whether the harvester 100 (e.g., spout 118 of harvester 100) is going to impact the door(s) during operation. Auger position sensor 232 may sense the position of the unloading auger 162 and/or spout 118 and generate an output signal indicative of the sensed position. Such a signal may also be helpful to ensure that no contact occurs between any part of harvester 100 and receiving vehicle 102. Sensors 230 and 232 may, for instance, be Hall Effect sensors, potentiometers, contact sensors, various types of non-contact sensors, such as imaging systems (e.g., cameras), or other sensors.

Automatic fill control system 208, as discussed above, may control the unloading auger 162 and generate outputs to control the relative position of vehicles 100 and 102 relative to one another to fill receiving vehicle 102, with harvested material, without over filling the cart 106 or without over filling an area of the cart 106. Over filling can lead to material spill. In addition, automatic fill control system 208 can communicate with the machine synchronization system 292 on receiving vehicle 102 in order to control the relative position of the two vehicles to accomplish a desired fill pattern (such as a front-to-rear fill pattern, a rear-to-front fill pattern, etc.).

Synchronized machine operation control system 210 can generate outputs to receiving vehicle 102 and receive inputs from receiving vehicle 102 and therefore facilitate the synchronized control of vehicles 100 and 102, during a breakthrough harvesting pass, and at other times. Machine synchronization system 236 may receive inputs from other systems in control system 210 and from sensors 206 and from the operator 186 and/or from receiving vehicle 102, and generate outputs to control harvester 100 and vehicle 102 during the unloading operation in a breakthrough harvesting pass. Therefore, system 236 may use automatic fill control system 208 or other systems to control harvester 100 and vehicle 102 so that the vehicles stay in a desired spatial relationship relative to one another so that the harvested material can be unloaded from harvester 100 into the receiving vehicle 102, without collision between the harvester 100 and the receiving vehicle 102, without the receiving vehicle 102 driving over unharvested crop, without spilling harvested material, etc. System 236 can thus receive inputs from receiving vehicle 102 or proximity sensors 222, which indicate the relative speed of the two vehicles and the relative proximity of the two vehicles, and can thus control the two vehicles to stay in a desired spaced relationship relative to one another (e.g., to stay spaced side-to-side and front-to-back relative to one another by a desired spacing), even as they travel through the field.

Logistics control system 240 can process logistics criteria to identify an advisable location of the breakthrough harvesting pass, or to indicate that unloading should not be performed during the breakthrough pass, for logistical reasons (e.g., based on logistical criteria). For instance, harvester 100 may have an associated harvest plan (which may be generated by operator 106 or automatically or in other ways) indicating how the field is to be harvested, such as the route of harvester 100, the unloading locations, etc. The harvest plan may indicate where unloading vehicles (such as semi-trailers) will be parked. The harvest plan may also indicate the estimated yield at various portions of the field, or the yield can be obtained in other ways. Logistics control system 240 may process these logistics criteria to identify a suggested location for a breakthrough harvesting pass so that the receiving vehicle 102 will be full at a desired location (such as a location near the unloading vehicle, etc.).

Similarly, the logistics control system 240 may analyze the remaining capacity of the receiving vehicle 102 and the remaining capacity of the clean grain tank on harvester 100 and determine whether the receiving vehicle 102 should attempt to receive harvested material during the breakthrough pass. For instance, assume that the receiving vehicle 102 is already half filled to capacity. Assume also that, given the width of header 114 and the estimated yield in the field at the location of the breakthrough harvesting pass, that the receiving vehicle 102 will run out of capacity prior to traversing the entire breakthrough harvesting pass. In that case, logistics control system 240 may generate an output indicating that the receiving vehicle 102 should first unload at the unloading vehicle (e.g., semi-trailer) and then proceed to receiving harvested material during the breakthrough harvesting pass. In another example, logistics control system 240 may consider, in addition to the current fill level, dynamics of the receiving vehicle 102, particularly of the cart 106, during the breakthrough pass to determine whether the receiving vehicle 102 should attempt to receive harvested material during the breakthrough pass. For instance, dynamics (e.g., pitch and/or roll) of the receiving vehicle 102 can reduce the effective remaining capacity of the receiving vehicle 102. For example, the fill level of the receiving vehicle 102 may indicate a remaining capacity of 50%, however, given the dynamics of the receiving vehicle 102 during the breakthrough pass, the effective remaining capacity may only be 30%. This is because the dynamics of the receiving vehicle 102 may lead to material spill if filled beyond the 30%. In another example, logistics control system 240 may consider, in addition to the current fill level and/or dynamics of the receiving vehicle, characteristics of the harvested crop material such as the moisture or the angle or repose of the harvested material pile in the receiving vehicle 102. For instance, the harvested material may be more or less likely to shift and spill based on the angle of repose of the harvested material pile and the moisture of the harvested material and thus, the effective remaining capacity of the receiving vehicle 102 may be reduced. For example, the fill level of the grain cart may indicate a remaining capacity of 50%, however, given the angle of repose and/or the moisture of the harvested material the effective remaining capacity may only be 30%. This is because the angle of repose and/or the moisture of the harvested material may lead to material shift and spill if filled beyond the 30%. Similarly, the angle of repose and/or moisture can further reduce the effective remaining capacity even further beyond than the reduction due to other characteristics, such as dynamics of the receiving vehicle 102. Keeping with the example above, the fill level may indicate a remaining capacity of 50% and the machine dynamics may reduce the remaining capacity to 30%. However, given the angle of repose and/or moisture of the harvested material, the remaining capacity may be reduced even further, for example, to 20%. In another example, logistics control system 240 may generate an output indicting that a different receiving vehicle (one that is empty or that has greater remaining capacity) should receive harvested material during the breakthrough harvesting pass, so that vehicle 102 can proceed to the unloading point and unload. These and other logistics criteria can be evaluated by logistics control system 240 to determine a suggested location of the breakthrough harvesting pass, and/or to determine whether the receiving vehicle 102 should be used in the breakthrough harvesting pass, among other things. In some examples, logistics control system 240 may consider, as logistical criteria, the amount of available receiving vehicles 102, and may generate an output that multiple receiving vehicles 102 should be used for unloading during a breakthrough pass, first filling one receiving vehicle 102 and then filling a second receiving vehicle 102 during the unloading in the breakthrough pass. For example, where multiple receiving vehicles 102 are available, a breakthrough pass may be tenable as compared to a situation in which only one receiving vehicle 102 is available.

Interlock control system 238 illustratively receives inputs and generates one or more outputs indicating whether an interlock condition exists. The interlock condition may indicate that the vehicles should not begin unloading during a breakthrough pass for a variety of reasons. For instance, interlock control system 238 may receive an input identifying the path ahead of harvester 100, showing that the path is on a side hill, is in muddy soil, etc. In that case, it may be undesirable to attempt to perform unloading during the breakthrough pass. In some examples, it may be that only a portion of a breakthrough pass is suitable for unloading, in which case, unloading during the breakthrough pass can be undertaken up to a location at which the pass becomes unsuitable for unloading. Similarly, it may be that the vehicles 100 and 102 are not close enough to one another or are too close to one another. It may be that parts of the vehicles are positioned so that unloading should not be performed because the vehicles would likely come into undesirable contact with one another. For example, the travel path may have curvature or other terrain features which may cause a change in distance between the two machines. Therefore, interlock control system 238 can process the vehicle-to-vehicle clearance to generate an output indicating that the vehicles are not or would likely not be in proper spaced relationship with one another to perform unloading during a breakthrough pass. In addition, interlock control system 238 may process the vehicle-to-environment clearance to determine whether unloading should be performed. By way of example, there may be obstacles (rocks, waterways, etc.) in close proximity to the vehicles so that unloading should not be performed during the breakthrough pass. In another example, interlock control system 238 may process the harvest plan and/or AB line spacing to determine whether a breakthrough harvesting unloading should occur. For instance, where a breakthrough harvesting pass would affect the spacing of other planned passes, or would result in a pass that is less than the width of the header or has less rows than the amount of row units on the header, an interlock condition may exist. These and other interlock criteria can be evaluated by interlock control system 238 to determine whether an interlock condition exists, in which case unloading during the breakthrough pass would be inadvisable. Interlock control system 238 can generate an output indicative of the interlock condition and/or indicating that no interlock condition exists.

Runtime monitor and control system 242 monitors the operation of harvester 100 and may receive inputs indicating characteristics or parameters of the operation of vehicle 102 in order to control the vehicles as desired. For instance, runtime monitor and control system 242 may receive inputs from sensors 206 monitoring the characteristics of harvester 100, such as whether harvester 100 unexpectedly changes speed or heading, or unexpectedly stops working (e.g., if the unloading subsystem 252 stops working, such as stops working at a desired level, stops working altogether, or otherwise malfunctions). System 242 can generate outputs to machine synchronization system 236 so that system 236 can generate control signals using control signal generator 244 to control the operation of the vehicles based upon the monitored characteristics. By way of example, if harvester 100 suddenly changes direction or stops, this can be output by system 242 so that machine synchronization system 236 can generate a control signal using control signal generator 244 to synchronize the operation of vehicles 100 and 102 to simultaneously stop so that they do not collide with one another and so that harvested material is not inadvertently dumped on the ground, etc. Similarly, if vehicle 102 suddenly stops, then an indication of this can be output by system 242 so that machine synchronization system 236 can generate a control signal using control signal generator 244 to control unloading subsystem 252 to stop the unloading auger so that the harvested material is not dumped on the ground (given the fact that vehicle 102 has stopped and is likely out of range of the unloading spout). Synchronized machine operation control system 210 can receive other inputs and generate other outputs to synchronize or otherwise coordinate the operation of harvester 100 and receiving vehicle 102 in other ways as well. Additionally, synchronized machine operation control system 210 can utilize machine dimensionality data to synchronizes or otherwise coordinate the operation of harvester 100 and receiving vehicle 102.

Propulsion subsystem 248 illustratively includes an engine and a transmission or drive train (or another system such as multiple drive motors, etc.) that is used to propel harvester 100 over the ground. Steering subsystem 250 can be mechanisms that steer harvester 100. The propulsion subsystem 248 and steering subsystem 250 can receive inputs from operator 186 or automated inputs from synchronized machine operation control system 210 or other systems on harvester 110 in order to control the propulsion and steering of harvester 110. Unloading subsystem 252 illustratively includes the functionality that is used to unload grain from the clean grain tank of harvester 100. Thus, the unloading subsystem 252 may include an unloading auger or other transport mechanism, the positioning actuators for positioning the spout 118, and any of a wide variety of other unloading functionality. Operator interface subsystem 254 can include operator input mechanisms, such as joystick(s), steering wheel, levers, handles, linkages, knobs, buttons, etc. for receiving inputs from an operator. Operator interface subsystem 254 can also include mechanisms for providing an output to an operator, such as a display screen, an audio output mechanism, or any other audio, visual or haptic output mechanisms. Similarly, where speech recognition is facilitated, operator interface subsystem 254 can include a microphone and speaker for receiving speech inputs and synthesizing or outputting speech outputs. Also, the operator interface subsystem 254 can include a touch sensitive screen for receiving inputs and displaying outputs. The touch sensitive screen can display touch actuators such as icons, buttons, links, etc., that can be actuated by an operator using touch gestures. Regardless of whether the screen is touch enabled, such actuators can also be actuated using voice commands, a point and click device, etc.

On receiving vehicle 102, communication system 262 may be similar to, or different from, communication system 198 on harvester 100. In the example discussed herein, they are assumed to be similar communication systems so that system 262 also includes a link control system for establishing and maintaining a communication link, and other items.

In receiving vehicle sensors 264, position sensor 272, heading sensor 274 and speed sensor 276 can be similar to, or different from, the position sensor 216, heading sensor 218, and speed sensor 220. For purposes of the present description, it is assumed that they are similar so that they need not be described in more detail. This is by way of example only. In addition, machine operation sensors 278 may sense the various operational characteristics of receiving vehicle 102. For instance, sensors 278 may detect whether any traction control subsystems are working, or sensors 278 may sense the operational characteristics of other parts of receiving vehicle 102. Proximity sensor 280 can also be similar to proximity sensors 222. Thus, proximity sensors 280 can detect the proximity of harvester 100 relative to receiving vehicle 102, as well as the proximity of other things, such as obstacles, relative to receiving vehicle 102.

Machine dynamics sensors 281 may be sensor(s) that sense the pitch, roll, and/or yaw of receiving vehicle 102. Some examples of machine dynamics sensors 281 can include inertial measurement units (IMUs), accelerometers, gyroscopes, magnetometers, as well as various other types of sensors.

Machine sensors 282 may include door position sensors 284 and auger sensor 286. Door position sensors 284 may detect whether actuatable (foldable) door(s) of the grain cart 106, such as doors 2220, 2221, are open or closed. Similarly, where the grain cart 106 has an unloading auger, auger position sensor 286 may detect the position of the unloading auger. This information may be useful in avoiding undesirable contact between any part of receiving vehicle 102 and harvester 100 as well as contact between any part of harvester 100 or receiving vehicle 102 with obstacles that are on the field or proximate to the field, such as trees, poles, etc. that may be present.

Fill level sensors 283 may be camera (e.g., similar to camera 120) or another fill level sensor that senses the fill level of harvested material in the receiving vehicle 102. Fill level sensors 283 may be similar to fill level sensors 223 or may be different types of sensors. In addition to detecting a fill level of receiving vehicle 102, fill level sensors 283 in the form of a camera can be used to detect an angle of repose of the harvested material pile in the receiving vehicle 102.

It will be noted that synchronized machine operation control system 266 may be similar to system 210 on harvester 100. In addition, there may be a single synchronized machine operation control system and it may be located entirely on harvester 100, or entirely on vehicle 102, or it may be distributed between the two vehicles or even in another system 184. For purposes of the present description, it will be assumed that receiving vehicle 102 has at least a portion of a synchronized machine operation control system 266 deployed on it. Machine synchronization system 292 may be a counterpart to machine synchronization system 236 on harvester 100 so that it interacts with system 236 to ensure that vehicles 100 and 102 maintain a desired spacing relative to one another. Thus, system 292 may receive the "nudge" signals from system 236 and control the propulsion and/or steering subsystems 304 and 306, respectively, to nudge receiving vehicle 102 forward or rearward relative to harvester 100 or to nudge receiving vehicle closer to or farther away from (laterally) harvester 100, or both. In other examples, it may be that unloading subsystem 252 is controlled (e.g., by control system 210) to change a position of the unloading subsystem 252 (e.g., spout 118) instead of or in addition to changing the relative position between receiving vehicle 102 and harvester 100.

As discussed with respect to interlock control system 238, interlock control system 294 can process one or more of path characteristics (e.g., terrain characteristics, route characteristics, soil profile characteristics, crop coverage characteristics, etc.), vehicle-to-vehicle clearance characteristics, and/or vehicle-to-environment clearance characteristics, to determine whether an interlock condition exists. By way of example, if the route characteristics for the path ahead of harvester 100 indicate that the path is muddy or is on a hill, this may be an interlock condition indicating that unloading should not be attempted on a breakthrough pass in that terrain. If the clearance characteristics indicate that the vehicles are too close to one another (e.g., if the receiving vehicle 102 and harvester 100 are too close laterally [e.g., lateral clearance or clearance perpendicular to direction of travel], if the forward extremity of the receiving vehicle 102 is too close to the rear extremity of the harvester 100 [e.g., fore-to-aft clearance or clearance in the direction of travel], if door(s) on the grain cart 106 are open or if a vehicle auger is out of position) then this may indicate an interlock condition indicating that unloading should not be performed at that time.

Logistics control system 296 may be similar to or different from logistics control system 240. Therefore, logistics control system 296 can analyze logistical criteria such as the harvest plan, and the capacity (e.g., total capacity and/or remaining capacity) of receiving vehicle(s) 102, the number of receiving vehicle(s) 102 available, the estimated yield and the width of header 114, among other logistical criteria to determine a desirable location for a breakthrough pass in this portion of the field, and whether the current receiving vehicle 102 should participate in the unloading operation in that breakthrough pass.

Runtime monitor and control system 298, like runtime monitor and control system 242, can monitor runtime characteristics so that control signals can be generated to control vehicles 100 and/or 102 during the unloading process, based upon those runtime characteristics. For instance, system 298 may receive inputs from position sensor 272 and heading sensor 274, as well as speed sensor 276, to determine whether the receiving vehicle has suddenly changed speeds or changed heading. If so, this can be output to machine synchronization system 292 which can generate control signals to control receiving vehicle 102 and/or harvester 100 based upon those characteristics. By way of example, if the receiving vehicle 102 has suddenly stopped or drastically (e.g., relative to a threshold, etc.) changed course, then this can be detected and output by system 298 to machine synchronization system 292. System 292 can generate control signals using control signal generator 300 to synchronously bring harvester 100 and receiving vehicle 102 both to a stop. This is just one example of the operation of runtime monitor and control system 298.

Propulsion subsystem 304 is used to propel receiving vehicle 102 over the ground. Steering subsystem 306 is used to control the steering or heading of vehicle 102, and auger subsystem 308 includes an unloading auger and control functionality for unloading the receiving vehicle. Operator interface subsystem 310 can be similar to operator interface subsystem 254.

Figure 5:
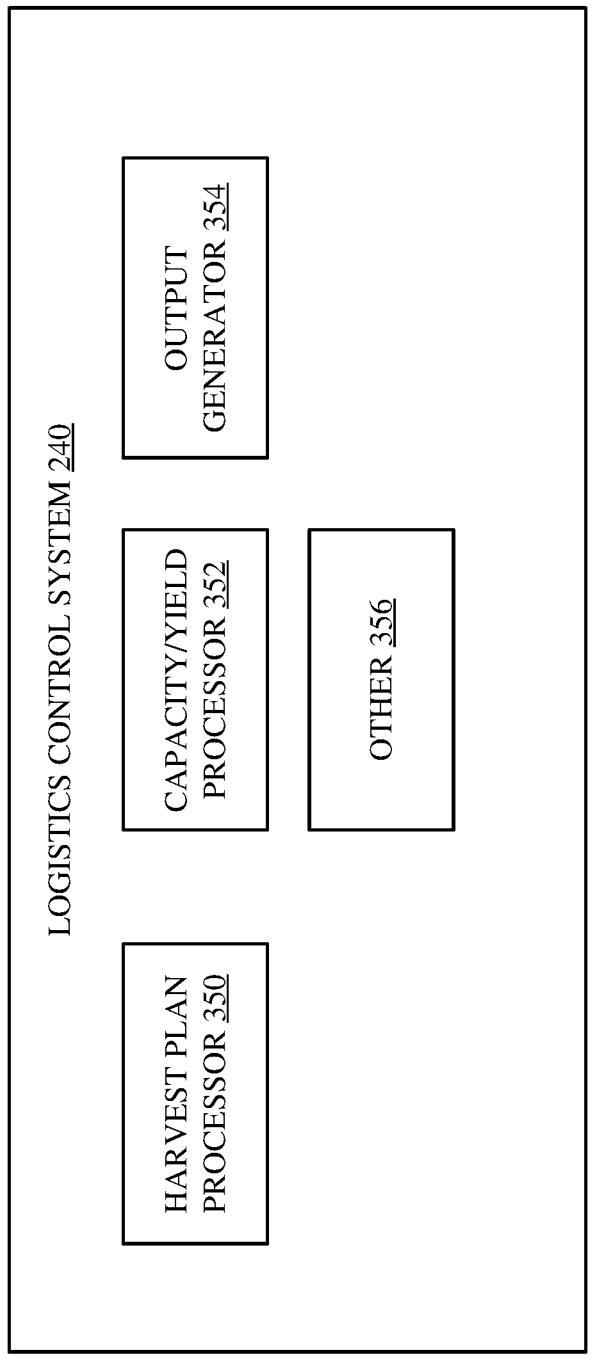
FIG. 5 is a block diagram showing one example of a logistics control system.

FIG. 5 is a block diagram showing one example of logistics control system 240. It will be noted that logistics control system 240 can be the same or different from logistics control system 296. For purposes of the present discussion, it is assumed that they are similar so only logistics control system 240 is described in more detail. Logistics control system 240 illustratively includes harvest plan processor 350, capacity/yield processor 352, output generator 354, and other items 356. Harvest plan processor 350 obtains an indication of a harvest plan that harvester 100 will be executing. The harvest plan may be automatically generated and stored in a data store that is accessible by harvest plan processor 350. The harvest plan may be input by operator 186 or a different operator. The harvest plan may be dynamically generated, or the harvest plan may be otherwise accessible to harvest plan processor 350. Harvest plan processor 350 can process the harvest plan to identify where the breakthrough passes in different sections of the field are scheduled to occur, and where they may be most desirable given logistical criteria (e.g., given the location of unload vehicles, the location of one or more receiving vehicles 102, the location of a field entrance, among other things). For instance, it may be that the breakthrough pass should be conducted at a location relatively close to the unload vehicles, because the receiving vehicles will likely be full. Capacity/yield processor 352 may obtain the physical dimensions of the receiving vehicle from an operator input, from the receiving vehicle itself (which may transmit its physical dimensions, capacity, etc.), as stored in a data store, or using default capacity measurements or in other ways. Capacity/yield processor 352 can also identify an estimated yield for the field in the area of the breakthrough pass and, using that in addition to the width of header 114, identify when the receiving vehicle 102 will likely be full. For example, in identifying an estimated yield, capacity/yield processor 352 may process sensor data, maps of the field, such as yield maps (e.g., predictive yield maps derived from vegetative index data, such as Normalized Difference Vegetative Index (NDVI) data), historical data (e.g., historical yield data), previous pass data, or a fusion of various data sources, such as a fusion of previous pass data and map data (e.g., NDVI data), as well as various other data. Further, capacity/yield processor 352 can also consider the dynamics of the receiving machine 102 (e.g., pitch and/or roll) in determining when the receiving vehicle will likely be full, at least to a threshold level. The threshold level may define a fill amount, which, if filled beyond, material spill is likely to occur. This is because the pitch and roll of the receiving vehicle 102 (e.g., the grain cart 106) may make material spill more likely or more likely to occur at lesser fill levels. Thus, the receiving vehicle 102 may be deemed to be full at a level less than its total capacity due to the dynamics of the receiving vehicle 102. Capacity/yield processor 352 may obtain sensor data (e.g., machine dynamics sensor data) or maps of the field, such as topographic maps, in determining dynamics of the machine. Further, capacity/yield processor 352 can also consider characteristic of the harvested material in determining when the receiving vehicle will likely be full, at least to a threshold level. The threshold level may define a fill amount, which, if filled beyond, material spill is likely to occur. This is because the characteristic of the harvested material, such as the moisture of the harvested material and/or the angle of repose of the harvested material pile in the receiving vehicle, may make material spill more likely or more likely to occur at lesser fill level. Thus, the receiving vehicle 102 may be deemed to be full at a level less than its total capacity due to the characteristic of the harvested material. Capacity/yield processor 352 may obtain sensor data (e.g., moisture sensor data, angel of repose sensor data) or maps of the field, such as crop moisture maps, in determining the characteristic of the harvested material.

As an example, assume that the receiving vehicle 102 is already partially full. Then, the receiving vehicle 102 may not be able to receive all the crop harvested by harvester 102 along the entire breakthrough pass. In that case, it may be advisable to have receiving vehicle 102 unload prior to executing the breakthrough pass. In another example, it may be advisable to have a different receiving vehicle 102, that is already unloaded, or has greater available capacity, execute the breakthrough pass with harvester 100 so that the receiving vehicle does not fill up part of the way through the breakthrough pass. As another example, the current fill level of the harvester 100 as well as the current fill level, and thus available (or remaining) capacity, of the receiving vehicle 102 may be considered. In some examples, the remaining capacity of the receiving vehicle 102 may be further identified based on dynamics (e.g., pitch and roll) of the receiving vehicle 102.

Figure 6:
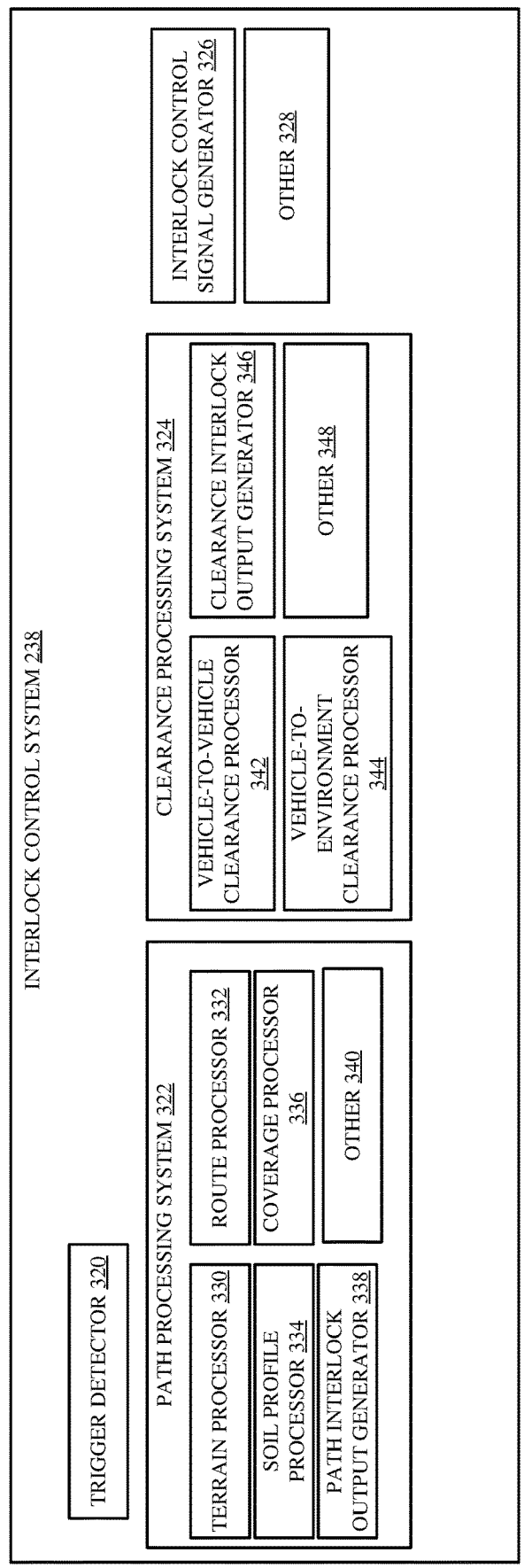
FIG. 6 is a block diagram showing one example of an interlock control system.

When either processor 350 or 352 indicate that some actions should be taken, they illustratively generate output signals that are provided to output generator 354. Generator 354 can generate an output that is provided to control signal generator 254 or to machine synchronization system 236 which, itself, provides an output to control signal generator 234. The control signal generator 234 can then generate an output to control vehicles 100 and 102 accordingly, to advise the operators of the output from logistics control system 240, or other outputs. FIG. 6 is a block diagram showing one example of interlock control system 238 in more detail. As discussed above, interlock control system 238 can be similar to interlock control system 294 on receiving vehicle 102. Also, the interlock control system 238 can be distributed across the two vehicles 100 and 102 so that part can be deployed as interlock control system 238 on harvester 100 and part can be deployed as interlock control system 294 on vehicle 102. In addition, the interlock control system can be distributed among the vehicles or can reside on other systems 184 and accessed by the vehicles, or it can be distributed in other ways.

In the example shown in FIG. 6, interlock control system 238 includes trigger detector 320, path processing system 322, clearance processing system 324, interlock control signal output generator 326, and other items 328. Path processing system 322 includes terrain processor 330, route processor 332, soil profile processor 334, coverage processor 336, path interlock output generator 338, and other items 340. Clearance processing system 324 includes vehicle-to-vehicle clearance processor 342, vehicle-to-environment clearance processor 344, clearance interlock output generator 346, and other items 348. Trigger detector 320 detects an interlock control system trigger indicating that interlock control system 238 should process inputs to identify whether an interlock condition exists. For instance, trigger detector 320 may be triggered based on an operator input indicating that the operator wishes to perform unloading during a breakthrough harvesting pass. In another example, trigger detector 320 can detect a trigger based upon the receiving vehicle 102 coming into close proximity to harvester 100. In another example, trigger detector 320 can be triggered if the estimated remaining yield in the breakthrough pass exceeds the remaining capacity of the on-board grain tank of the harvester 100, in which case, a receiving vehicle 102 may be called automatically to perform unloading during the breakthrough pass. The trigger can be detected in other ways and based on other criteria as well.

Path processing system 322 then identifies the path that harvester 100 will be taking during the breakthrough pass to determine whether unloading should be conducted during travel along that path or whether an interlock condition exists, indicating that unloading during the breakthrough pass is not desirable. Terrain processor 330 identifies the terrain ahead of harvester 100 in the breakthrough pass. For instance, a topographical map or another map can be obtained and examined at the location of the breakthrough pass to determine whether the pass is on a side hill, up hill, or has other terrain characteristics which may make it difficult to perform unloading during that pass. Route processor 332 obtains the route that harvest 100 will be taking to determine whether it is relatively straight, whether there are relatively sharp curves, or whether the route is otherwise unsuitable for unloading. By way of example, if the route has turns that exceed a threshold turn angle, the route may be deemed unsuitable for unloading. The threshold turn angle value can be manually set, determined empirically, set by a model or in other ways. Soil profile processor 384 obtains an indication of characteristics of the soil on the breakthrough pass to determine whether the soil may be unsuitable for the two vehicles to be in close proximity with one another. For instance, if the soil has a high moisture content, is muddy, is sandy, or has other characteristics where traction may and/or heading be difficult to maintain, then the soil profile on the breakthrough pass may be unsuitable for the performance of an unloading operation during that breakthrough pass. Coverage processor 336 identifies whether the field has already been harvested on one side of the breakthrough pass to determine whether tight control of the two vehicles is needed. Coverage processor 336 can obtain a coverage map or another indication of the portion of the field that has already been harvested. For example, if the receiving vehicle 102 can maintain a greater distance from harvester 100, because the crop on the same side of harvester 100 has already been harvested, then unloading may be performed where it would not be suitable to perform unloading during a breakthrough pass, where the two vehicles are in closer proximity with respect to one another. Soil profile processor 384 can obtain the characteristics of the soil profile on the breakthrough pass from a data store, based upon an operator input, based upon mapped soil characteristics, or in other ways. Route processor 332 can obtain an indication of the route of the breakthrough pass from the harvest plan, based on an operator input, or in other ways.

If path processing system 322 determines that an interlock condition is present, meaning that the characteristics of the path (or route characteristics) are such that performing unloading during the breakthrough pass is undesirable, then path interlock output generator 338 can generate an output signal indicating this. The output signal can identify the interlock, the reason for the interlock, possible remedial steps that can be taken, or other information.

Clearance processing system 324 identifies the clearance around the vehicles based upon sensor inputs and determines whether the clearance is adequate to perform unloading during the breakthrough pass. For instance, vehicle-to-vehicle clearance processor 342 identifies whether there is sufficient clearance between the two vehicles based on sensor signals from sensors, such as proximity sensors, machine sensors, machine dynamics sensors, as well as various other sensors, or from various other sources, such as maps of the field, or both. For instance, if the sensors indicate that door(s) of the receiving vehicle grain cart 106 is open, or that an auger or spout is positioned in an undesirable location so that the clearance between the two vehicles is not sufficient, then a clearance interlock is present and clearance interlock output generator 346 generates an output signal indicative of the interlock. In another example, clearance processing system 324 identifies the clearance around the vehicles based upon the geographic positions of the harvester 100 and the receiving vehicle 102 (e.g., as received from position sensor 216 and position sensor 272, respectively), dynamics (e.g., one or more of pitch, roll, and yaw) of the harvester 100 and the receiving vehicle 102 (e.g., as received from dynamics sensors 221 and dynamics sensors 281, respectively, or as derived from a map of the field, such as a topographic map), as well as known machine dimensionality. Vehicle-to-environment clearance processor 344 determines whether the clearance between the vehicles and objects in the environment is sufficient to perform unloading during the breakthrough pass. For instance, if there are objects in the path of harvester 100, that would be in the path of the receiving vehicle 102, or where there is insufficient clearance between the obstacle and the receiving vehicle 102, then vehicle-to-environment clearance processor 344 identifies an interlock condition and clearance interlock output generator 346 generates an output signal indicative of that interlock condition. Vehicle-to-environment clearance processor can determine whether the clearance between the vehicles and the objects in the environment is sufficient based on data from sensors 206 and sensor 264 or from other sources, such as maps of the field. As an example, the dynamics of the vehicles may be accounted for when determining whether clearance between the vehicles and objects of the environment is sufficient. The dynamics of the vehicles can be detected by respective dynamics sensors or the dynamics can be derived from a map of the field, such as a topographic map. The output signal can identify the interlock, the condition causing the interlock, or other information. Output generators 338 and 346 provide outputs to interlock control signal output generator 326. Generator 326 can generate a control signal output to control signal generator 244 (or control signal generator 300) to control one or both the vehicles 100 and 102 based upon the interlock conditions. For instance, the vehicles can be controlled to synchronously stop. One of the vehicles can be controlled to stop while the other is permitted to continue. The vehicles may be permitted to continue driving but the unloading operation is stopped (e.g., the unloading auger on harvester 100 is stopped, the unloading auger on harvester 100 is stopped and the spout 118 is moved to a storage position to avoid contact) temporarily, or other control actions can be taken. In another example, where a prospective path is not suitable for a breakthrough pass, for instance, due to insufficient clearance, a new path for a breakthrough pass can be identified.

Figure 7:
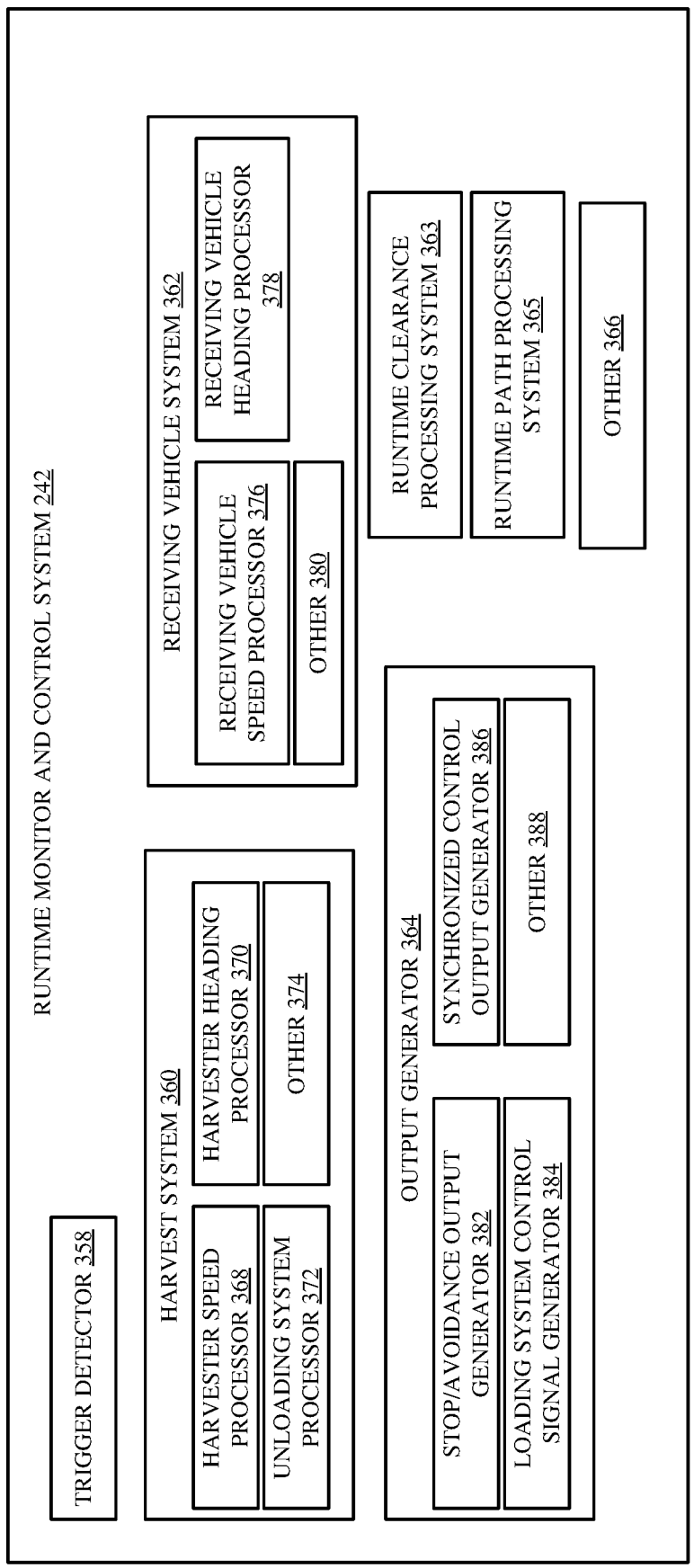
FIG. 7 is a block diagram showing one example of a runtime monitor and control system.

FIG. 7 is a block diagram showing one example of runtime monitor and control system 242. System 242 can include trigger detector 358, harvester system 360, receiving vehicle system 362, output generator 364, runtime clearance processing system 363, runtime path processing system 365, and other items 366. It will be noted that harvester system 360 may reside on harvester 100 while receiving vehicle system 362 may reside on receiving vehicle 102. Runtime monitor and control system 242 can be the same as runtime monitor and control system 298, or it can be different. In an example, system 242 can be distributed between the different machines 100-102, as well as on other systems 184. It is shown as a single system 242 for the sake of example only.

Harvester system 360 illustratively includes harvester speed processor 368, harvester heading processor 370, unloading system processor 372, and other items 374. Receiving vehicle system 362 illustratively includes receiving vehicle speed processor 376, receiving vehicle heading processor 378, and other items 380. Output generator 364 can include stop/avoidance output generator 382, loading system control signal generator 384, synchronized control output generator 386, and other items 388. Harvester speed processor 368 can receive input from one or more different sensors and determine whether harvester 100 has abruptly changed its speed by abruptly stopping, accelerating, or decelerating. If the harvester 100 unexpectedly stops quickly, that may make it difficult for receiving vehicle 102 to operate without undesirably contacting harvester 100 (such as by running into header 114, contacting the spout 118, etc.). The thresholds for considering whether the speed change is abrupt enough to be identified can be set manually, empirically, or dynamically, or in other ways, such as machine learning techniques.

Harvester heading processor 370 may process sensor signals to determine whether harvester 100 has abruptly changed its heading by an amount which may cause problems for the unloading process. For instance, when harvester 100 turns by a threshold number of degrees, that may make it more difficult for receiving vehicle 102 to stay behind header 114 during the breakthrough pass, without making contact with the harvester 100. Unloading system processor 372 may receive sensor inputs indicating whether the unloading subsystem 252 on harvester 100 stops working. This may happen, for instance, if shear bolts on the unloading auger shear off, or for other reasons. Harvester system 360 then generates an output to output generator 364 indicating when harvester 100 unexpectedly changes its speed or heading or when the unloading subsystem 352 malfunctions.

Receiving vehicle speed processor 376 can receive inputs from sensors 264 and receiving vehicle 102 (or from sensors on harvester 100) that indicate that the receiving vehicle has unexpectedly stopped or changed speed (such as unexpectedly accelerated or decelerated). Receiving vehicle heading processor 378 can receive sensor inputs indicating that the heading of receiving vehicle 102 has abruptly changed. If the receiving vehicle speed or heading has abruptly changed, this may mean that, unless harvester 100 stops or stops the unloading auger, that harvested material may be inadvertently dumped on the ground or elsewhere. Therefore, receiving vehicle system 362 provides a signal to output generator 364 indicating when the receiving vehicle unexpectedly changes its speed or heading.

Output generator 364 can generate an output based upon the inputs from harvester system 360 and/or receiving vehicle system 362 so that vehicles 100 and 102 can be controlled accordingly. For instance, if the conditions warrant it, as indicated by the signals from harvester system 360 and/or receiving vehicle system 362, then stop/avoidance output generator 382 can generate instructions indicating how harvester 100 and/or receiving vehicle 102 should be controlled in order to stop or avoid contact with one another. By way of example, if harvester system 360 indicates that the harvester has abruptly stopped, then stop/avoidance output generator 382 may generate an output indicating that receiving vehicle 102 should stop abruptly or be steered in a direction where it is unlikely to come into undesirable contact with harvester 100.

Loading system control signal generator 384 generates an output so that unloading subsystem 252 can be controlled based upon the inputs from harvester system 360 and/or receiving vehicle system 362. For instance, if receiving vehicle system 362 indicates that the receiving vehicle 102 has suddenly stopped and harvester 100 is still moving, then loading system control signal generator 384 can generate an output signal so that unloading subsystem 252 can be controlled to stop the unloading auger so that harvested material is not inadvertently dumped on the ground. Synchronized control output generator 386 can generate outputs to machine synchronization systems 236 and/or 292 so that vehicles 100 and 102 can be controlled synchronously. By way of example, if the harvester 100 is malfunctioning in some way, then it may be desirable to synchronously bring both vehicles 100 and 102 to a stop. Other synchronized control operations can be performed as well, such as to synchronously steer the vehicles in a certain direction to avoid an obstacle, synchronously increase power to the propulsion subsystem to climb a hill, etc.

Runtime clearance processing system 363 can be similar to clearance processing system 324 and can identify the clearance around the vehicles during the breakthrough pass to determine if clearance (e.g., vehicle-to-vehicle clearance, vehicle-to-environment clearance, etc.) is continuously sufficient for unloading along the breakthrough pass. Runtime path processing system 365 can be similar to path processing system 322 and can identify characteristics of the pass during the breakthrough pass to determine if the path is continuously suitable for unloading along the breakthrough pass.

Figure 8:
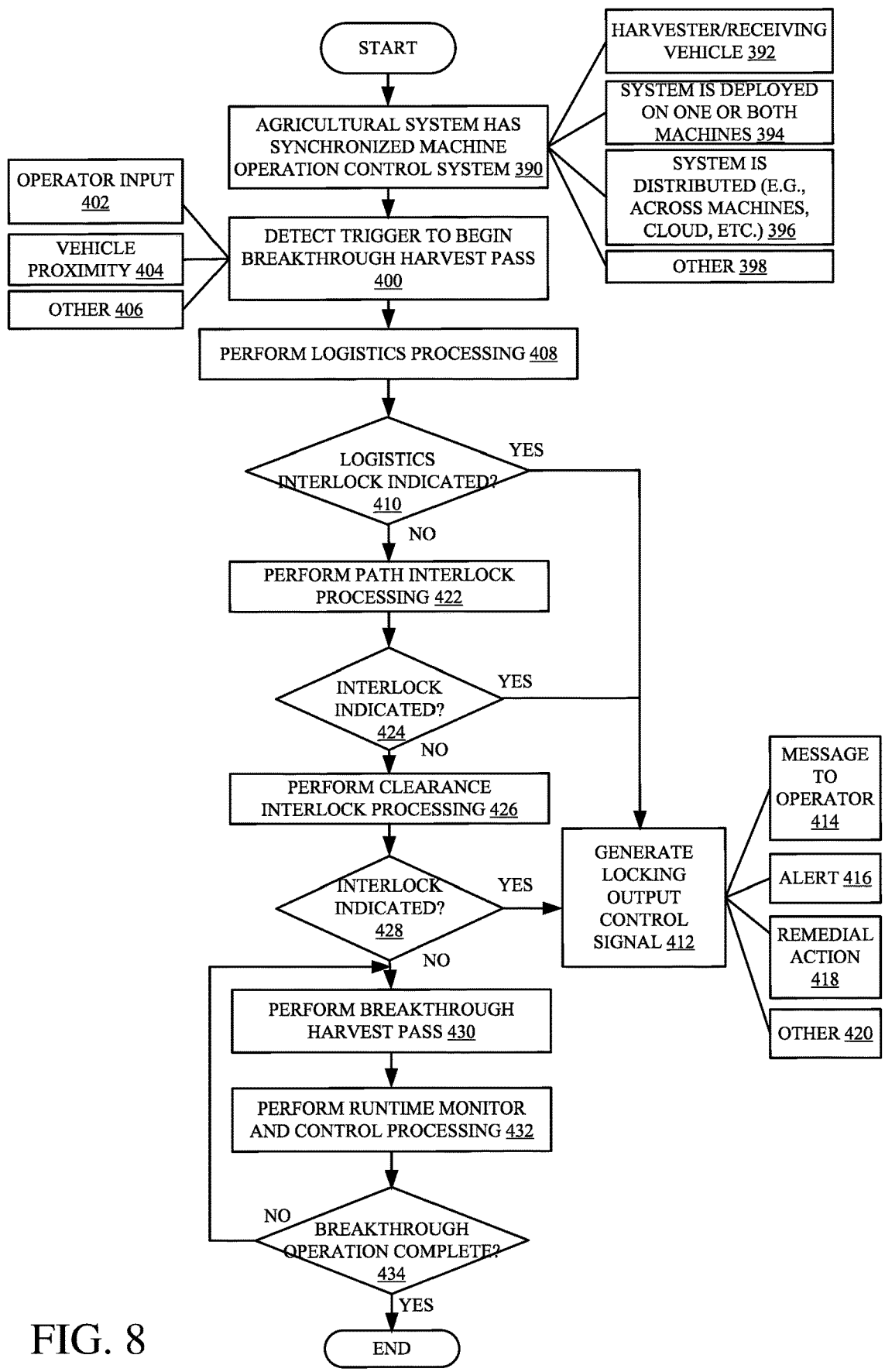
FIG. 8 is a flow diagram illustrating one example of the operation of the agricultural system.

FIG. 8 is a flow diagram illustrating one example of the operation of agricultural system 90, in controlling harvester 100 and receiving vehicle 102 during unloading in a breakthrough pass. It is first assumed that the agricultural system 90 has a synchronized machine operation system (210 and/or 266) deployed therein, as indicated by block 390 in the flow diagram of FIG. 8. In one example the agricultural system includes a harvester 100 and receiving vehicle 102, as indicated by block 392. The synchronized machine operation system can be deployed on one or both of the machines, as indicated by block 394, or the system can be distributed in a different way, such as across the machines, in a cloud environment, or in other ways, as indicated by block 396. The agricultural system 90 can use the synchronized machine operation system in other ways as well, as indicated by block 398. It will be understood that in examples where the agricultural system includes a plurality of harvesters 100 and/or a plurality receiving vehicles 102, the synchronized machine operation system can be deployed on one or more of the machines, or can be distributed in a different way, such as across the machines, in a cloud environment, or in other ways. Additionally, the example operation shown in FIG. 8 can be performed with one or more harvesters 100 and one or more receiving vehicles 102.

The synchronized machine operation control system then detects a trigger to begin a breakthrough harvest pass, as indicated by block 400 in the flow diagram of FIG. 8. The trigger can be an operator input, as indicated by block 402, or the trigger can be a vehicle proximity indicator, such as a geographic location of the vehicle at a point where the breakthrough pass is to begin, a proximity of the harvester to the receiving vehicle, or other vehicle proximity indication, as indicated by block 404. The trigger that a breakthrough harvest pass is to begin can be any of a wide variety of other triggers as well, as indicated by block 406.

Logistics control system 240 then performs logistics processing, as indicated by block 408. The logistics processing considers logistical criteria in determining when and where the breakthrough pass should occur. The logistics processing is described in greater detail elsewhere herein. Briefly, the logistics processing can generate an interlock condition indicating that the breakthrough pass should not be performed, or should be performed at a different location, based on logistical criteria. Determining whether the logistics processing system 240 generates an output indicating an interlock condition is indicated by block 410 in the flow diagram of FIG. 8.

If an interlock condition is present, control signal generator 244 generates a locking output control signal, as indicated by block 412, which can take different forms. The locking output control signal can be used to control operator interface subsystem 254 to generate a message to the operator, as indicated by block 414. The locking output control signal can control an alert device to generate an alert, as indicated by block 416, or it can be a remedial action control signal, as indicated by block 418. The remedial action control signal may be a signal to remedy the conditions that have given rise to the interlock condition. The locking output control signal can be any of a variety of other control signals as well, as indicated by block 420.

If, at block 410, it is determined that the logistics control system 240 has not generated a logistics interlock signal, then interlock control system 238 begins to perform interlock processing. By way of example, and referring again to FIG. 6, path processing system 232 can perform path interlock processing, as indicated by block 422. Path interlock processing system 322 may generate an output indicating that an interlock condition exists. If so, as indicated by block 424, then processing again continues at block 412 where interlock control signal output generator 326 generates a locking output control signal. However, if no path processing interlock condition exists, then clearance processing system 324 performs clearance interlock processing, as indicated by block 426. If a clearance interlock condition is present, as indicated by block 428, then processing again reverts to block 412 where a locking output control signal is generated. However, if no clearance interlock condition is identified, at block 428, then the agricultural harvester 100 and receiving vehicle 102 begin to perform the breakthrough harvest pass, as indicated by block 430 in the flow diagram of FIG. 8. Runtime monitor and control system 242 also begins to perform runtime monitor and control processing, as indicated by block 432. Runtime monitor and control system 242 continues to perform processing until the breakthrough pass is complete, as indicated by block 434.

Figure 9:
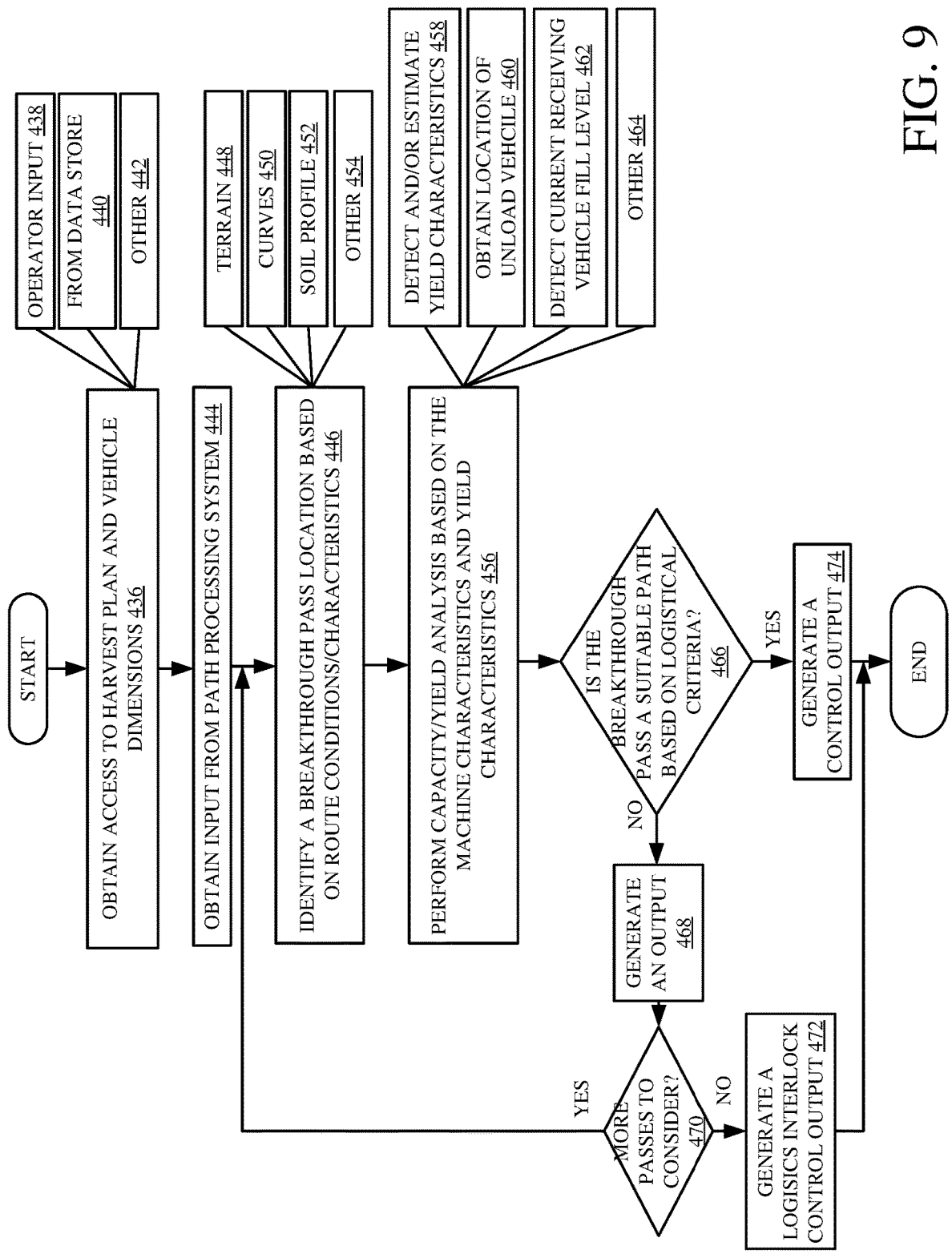
FIG. 9 is a flow diagram showing one example of the operation of the logistics control system.

FIG. 9 is a flow diagram illustrating one example of the operation of logistics control system 240 (as represented by block 408 in FIG. 8), in more detail. Harvest plan processor 350 first obtains access to a harvest plan which indicates how harvester 100 is to harvest the field. Processor 350 also obtains vehicle dimensions of the harvester 100, the receiving vehicle 102, and/or other vehicles involved in the harvesting operation. Obtaining access to the harvest plan and vehicle dimensions is indicated by block 436 in the flow diagram of FIG. 9. The harvest plan and/or vehicle dimensions can be input by an operator, as indicated by block 438, or obtained from a data store (such as data store 192 or data store 260 or a data store on other systems 184), as indicated by block 440, or obtained in other ways, as indicated by block 442.

Logistics control system 240 can also receive an input from path processing system 322, indicative of whether the terrain in the area of harvester 100 will be suitable for a breakthrough harvesting pass. Receiving the input from path processing system 322 is indicated by block 444 in the flow diagram of FIG. 9.

Harvest plan processor 350 then identifies a breakthrough pass location for a section of the field that is about to be harvested, based upon the route conditions and characteristics, as input by the path processing system 322. Identifying the breakthrough pass location is indicated by block 446 in the flow diagram of FIG. 9. The identification of the breakthrough pass location can be based upon the characteristics of the terrain 448, the curves in the proposed path as indicated by block 450, the soil profile 452, and/or a wide variety of other criteria 454 such as the proximity to the field entrance, the proximity to unloading vehicle(s) (e.g., semi-trailer(s)), the distance from a previous breakthrough pass, the number of harvesters 100 included in the operation, as well as various other criteria.

Capacity/yield processor 352 then performs capacity/yield analysis based upon the machine characteristics and the yield characteristics of the crop in the identified breakthrough pass. Performing capacity/yield analysis is indicated by block 456 in the flow diagram of FIG. 9. The capacity/yield processor 352 can detect or otherwise estimate yield characteristics indicative of the yield in the field along the breakthrough pass. Detecting or estimating yield characteristics is indicated by block 458. Capacity/yield processor 352 can also identify the location of the unload vehicles in the field, such as semi-trailers, etc. as indicated by block 460. Capacity/yield processor 352 can also obtain or detect the current fill level of the receiving vehicle 102, and thus the available or remaining capacity, as indicated by block 462. The capacity/yield processor 352 can obtain other information to perform analysis as well, as indicated by block 464, such as dynamics of the receiving vehicle and/or characteristics of the harvested material. For example, but not by limitation, likely dynamics (e.g., pitch or roll) of the receiving vehicle 102, can be obtained based on sensor data or based on maps of the field, such as a topographic map, or based on various other data, such as historical data. As discussed above, the dynamics of the receiving vehicle 102 may affect the effective remaining capacity of the receiving vehicle 102. In another example, but not by limitation, characteristics of the harvested material such as the moisture of the harvested material and/or the angle of repose of the harvested material pile, can be obtained based on sensor data or based on maps of the field, such as a crop moisture map, or based on various other data, such as historical data. As discussed above, the characteristics of the harvested material in the receiving vehicle 102 may affect the effective remaining capacity of the receiving vehicle 102.

Logistics control system 240 then determines whether the identified breakthrough pass is a suitable path based upon logistical criteria, as indicated by block 466. For instance, based on the width of the header 114, and based on the estimated yield, capacity/yield processor 352 may determine whether the receiving vehicle 102 has sufficient available capacity to receive the harvested crop throughout the entire breakthrough pass. If not, then this may not be a suitable breakthrough pass with this particular receiving vehicle 102. Further, harvest plan processor 350 may determine that the unloading vehicle is a great distance from where the receiving vehicle will be full and therefore the identified breakthrough pass is unsuitable or suboptimal. If logistics control system 240 determines that the breakthrough pass is not suitable based on logistical criteria, then output generator 354 generates a locking output control signal, as indicated by block 468. The locking output control signal may again be an output on an operator interface mechanism, an alert, a control output or another type of output. Logistics control system 240 then determines whether there are more breakthrough passes, at other locations, that may be considered, as indicated by block 470. If so, processing reverts to block 446 where the location of a different possible breakthrough pass is identified.

If, at block 470 it is determined that there are no more breakthrough passes to consider, then logistics control system 240 generates a locking output control signal, as indicated by block 472. The logistics locking output control signal may be to indicate to the operator that the breakthrough pass is not advisable and the reasons (such as that the receiving vehicle 102 may run out of capacity during the breakthrough pass, that the receiving vehicle 102 will be full a great distance from the unloading vehicle, or for other logistics considerations).

If, at block 466, logistics control system 240 determines that the identified breakthrough pass is suitable based on the logistical criteria, then output generator 354 generates a control output indicating that. The control output may simply indicate that the identified breakthrough pass meets the logistical criteria, or that the identified breakthrough pass is logistically suitable in other ways as well, as indicated by block 474.

Figure 10:
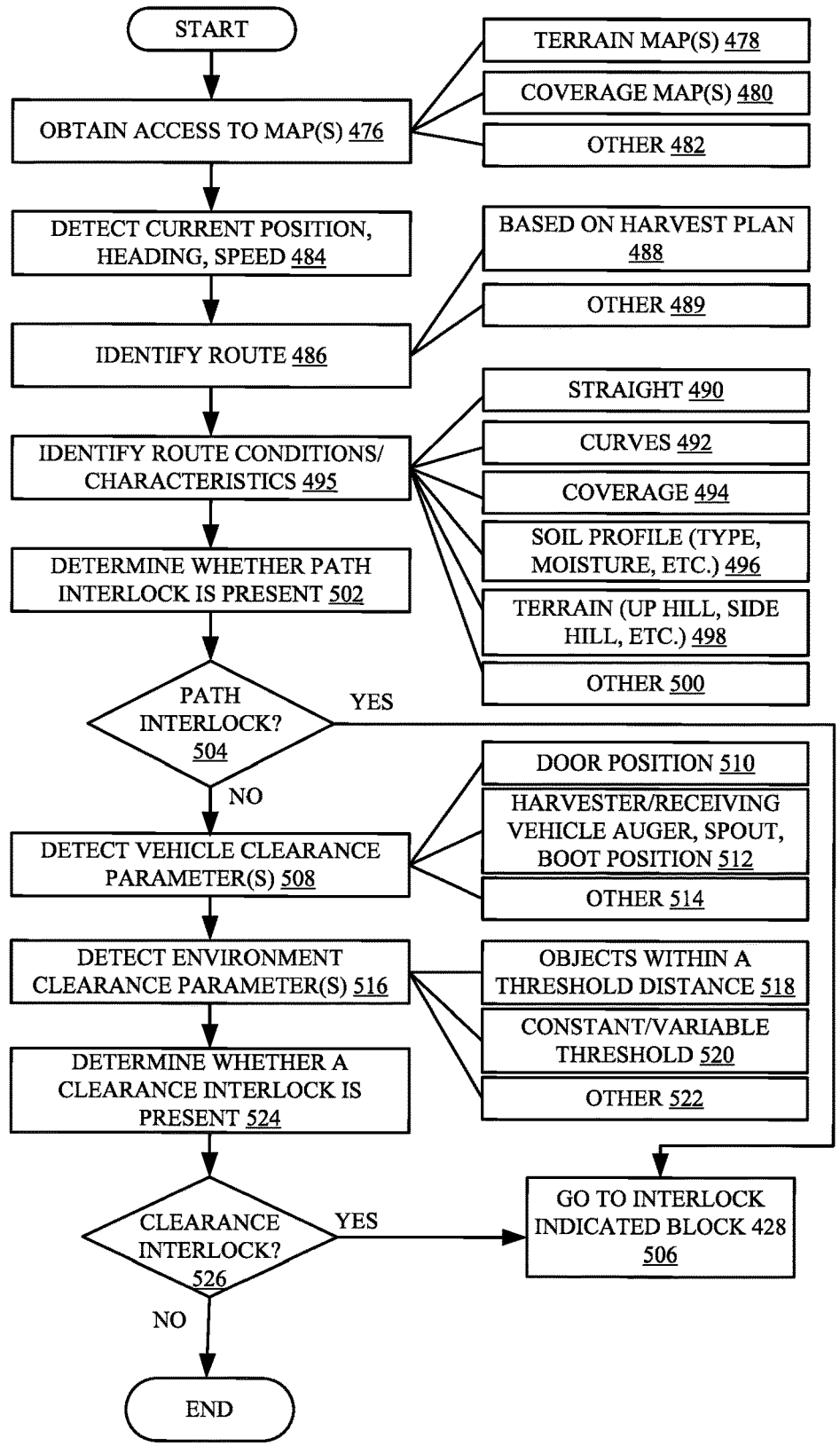
FIG. 10 is a flow diagram showing one example of the operation of an interlock control system.

FIG. 10 is a flow diagram illustrating one example of the operation of interlock control system 238 as discussed above with respect to blocks 422-426 in FIG. 8. Once the interlock control system 238 is triggered to perform interlock processing, path processing system 322 obtains access to maps that map different characteristics of the field in the area of the breakthrough harvesting pass. Obtaining access to one or more maps is indicated by block 476. The maps can be terrain maps 478, coverage maps 480, or any of a wide variety of other types of maps 482. Such maps can be provided by the operator, retrieved from a data store, as well as obtained in various other ways. Path processing system 322 then receives inputs indicative of the current position of harvester 100, as well as the heading and speed of harvester 100, as indicated by block 484.

Route processor 332 then identifies the route through the field, of the breakthrough harvesting pass. Identifying the route is indicated by block 486. The route processor 332 can identify the route based on the harvest plan, as indicated by block 488, or in other ways.

Path processing system 322 then identifies various route conditions or characteristics as indicated by block 495. For instance, route processor 332 can identify whether the route is straight or curved as indicated by blocks 490 and 492. If the route is curved, the extent or sharpness of the curves (the angle of the curves) can be identified as well. Coverage processor 336 can determine whether different portions of the field adjacent the breakthrough pass have already been harvested, as indicated by block 494. Soil profile processor 384 can identify different characteristics of the soil (such as the type of soil, soil moisture, etc.) as indicated by block 496. Terrain processor 330 can identify different characteristics of the terrain, such as whether the terrain is up hill, on a side hill, etc., as indicated by block 498. Path processing system 322 can also identify other route conditions or characteristics as indicated by block 500.

Path processing system 322 then determines whether a path interlock is present based upon the route and route characteristics, as indicated by block 502 in the flow diagram of FIG. 10. For instance, if the path of the breakthrough pass will be through mud or other soil where traction will be difficult, this may present an interlock condition. If the route is up hill or on side hill, or has sharp curves, this may also indicate that unloading should not be performed on the breakthrough pass. In some examples, it may be that only one or more portions of the breakthrough pass are suitable for unloading, in which case, unloading can be performed along the one or more portions of the pass that are suitable for unloading and not performed along the portion(s) of the breakthrough pass that are unsuitable. These are just some examples of interlock conditions that may be detected by path processing system 322 based on characteristics corresponding to the path. If a path interlock is detected, as indicated by block 504, then processing continues in FIG. 8 at block 424 (as indicated by block 506 in the flow diagram of FIG. 10).

Assuming that path processing system 322 does not identify an interlock condition based on path processing, at block 504, then clearance processing system 324 performs clearance processing. Vehicle-to-vehicle clearance processor 342 detects any clearance parameters or characteristics that may bear upon whether there is sufficient vehicle-to-vehicle clearance to perform unloading during the breakthrough pass. Detecting the vehicle clearance parameters is indicated by block 508 in the flow diagram of FIG. 10. Some examples of vehicle clearance parameters may include the door position (such as whether door(s) on the grain cart 106 are open) as indicated by block 510. The vehicle clearance parameters may include the position of the spout on harvester 100 or receiving vehicle auger as indicated by block 512. The vehicle-to-vehicle clearance processor 342 may detect a wide variety of other parameters or characteristics as well, as indicated by block 514, for example upcoming curvature of the pathway that may affect the clearance between the vehicles, the current and/or upcoming dynamics of the vehicles that may affect the clearance between the vehicles, such as one or more of the pitch, roll, and yaw of the vehicles. The vehicle-to-vehicle clearance parameters may be detected based upon sensor inputs, such as inputs from machine sensors 226 and 282 or other sensors or can be derived from other sources, such as maps of the field. In some examples, it may be that vehicle-to-vehicle clearance is only sufficient for unloading along one or more portions of the breakthrough pass, in which case, unloading can be performed along the one or more portions of the breakthrough pass where vehicle-to-vehicle clearance is sufficient and not performed along the portion(s) of the breakthrough pass where vehicle-to-vehicle clearance is insufficient.

Vehicle-to-environment clearance processor 344 then detects environment clearance parameters, as indicated by block 516. Detecting environment clearance parameters may include such things as detecting whether objects in the vicinity of the vehicles are within a threshold distance of the vehicles, as indicated by block 518. The threshold distance may be a constant or variable threshold distance as indicated by block 520. The environment clearance parameters may include a variety of other parameters detected in other ways as well, as indicated by block 522, for example, detecting whether objects are within a travel path of the vehicles, current and/or upcoming dynamics of the vehicles that may affect the clearance between the vehicles and the environment, such as one or more of the pitch, roll, and yaw of the vehicles. The environment clearance parameters may be detected based upon input from sensors, such as proximity sensors 222 and 280, or in other ways, such as derived from maps of the field. In some examples, it may be that vehicle-to-environment clearance is only sufficient for unloading along one or more portions of the breakthrough pass, in which case, unloading can be performed along the one or more portions of the breakthrough pass where vehicle-to-environment clearance is sufficient and not performed along the portion(s) of the breakthrough pass where vehicle-to-environment clearance is insufficient.

Clearance processing system 324 then determines whether a clearance interlock is present, as indicated by block 524. For example, if door(s) of the grain cart 106 are open such that there is a danger of the door(s) colliding with the other vehicle, or if the spout is in a position which presents a danger of collision, this may be identified as an interlock condition. In another example, if there are other objects that are in the path of the harvester 100 or receiving vehicle 102 or are so close that the vehicles may collide with that one or more object, this may be identified as an interlock condition as well. If a clearance interlock is present, as indicated by block 526, then processing again proceeds at block 428 in FIG. 8, where processing will proceed to block 412 in FIG. 8. Processing at block 428 is indicated by block 506 in the flow diagram of FIG. 10.

Figure 11A:
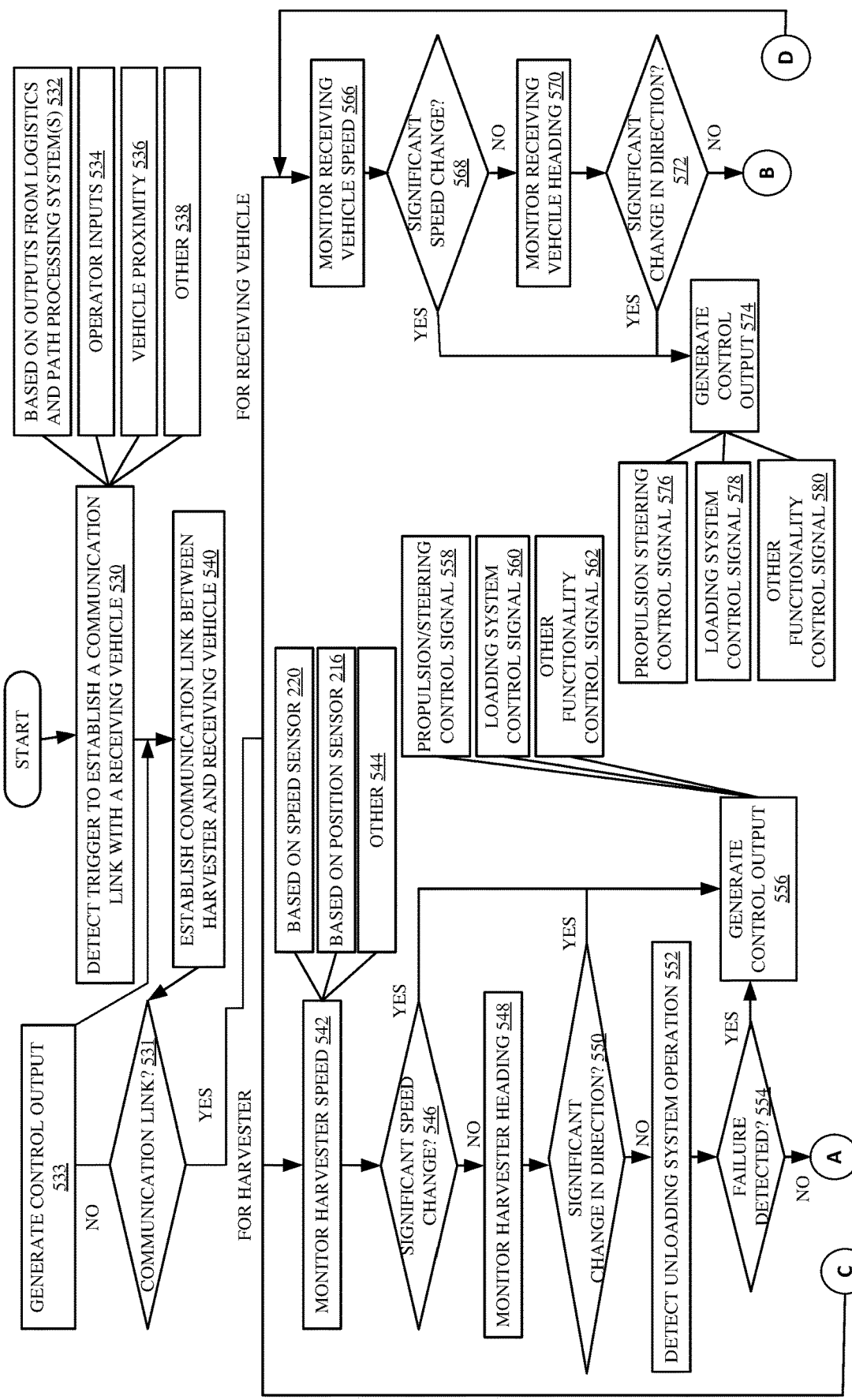
FIGS. 11A-11B (collectively referred to herein as FIG. 11) are a flow diagram showing one example of a runtime monitor and control system.
Figure 11B:
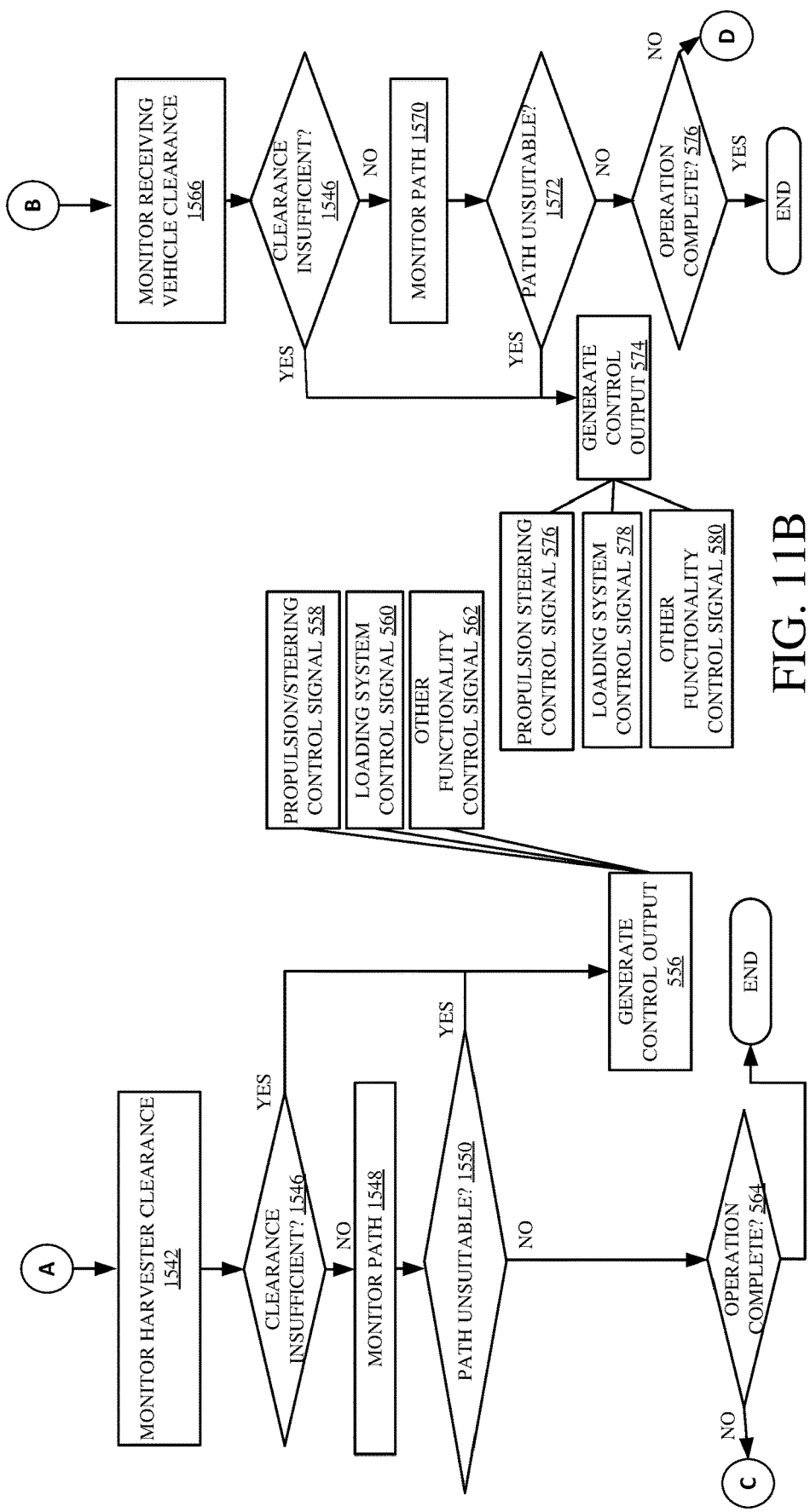

FIGS. 11A-B (collectively referred to herein as FIG. 11) are a flow diagram illustrating one example of the operation of runtime monitor and control system 242 (corresponding to block 432 in the flow diagram of FIG. 8) in more detail. It is first assumed that trigger detector 358 detects a trigger to establish a communication link with a receiving vehicle. Detecting the trigger is indicated by block 530 in the flow diagram of FIG. 11. The trigger can be detected in a wide variety of different ways. For instance, the trigger may be detected based on outputs from the logistics and path processing systems, as indicated by block 532. By way of example, if those systems indicate that there is no interlock condition, then this may indicate to runtime monitor and control system 242 that the breakthrough pass is about to begin. The trigger may be an operator input 534 indicating that the breakthrough pass is about to begin, or the trigger may be based on the proximity of receiving vehicle 102 to harvester 100. When the two vehicles are in close enough proximity, this may indicate that unloading on a breakthrough pass is about to begin. Detecting the trigger based on vehicle proximity is indicated by block 536 in the flow diagram of FIG. 11. Detecting a trigger to begin runtime monitoring and control processing may be based on a wide variety of other trigger criteria as well, as indicated by block 538.

Link control system 200 in communication system 198 then establishes a communication link with communication system 262 in receiving vehicle 102. The link can be a near field communication link, a cellular communication link, a Bluetooth communication link, or any of a wide variety of other communication links. Establishing the communication link is indicated by block 540 in the flow diagram of FIG. 11. Further, in some examples, it may be that a communication link cannot be established, or the communication link may be broken (e.g., disconnected). The status of the link is monitored during the operation, as indicated by block 531. If there is no communication link, then a control action can be taken, as indicated by block 533, such as to stop the harvester 100 and/or the receiving vehicle 104 until a communication link can be established or reestablished. If the communication link is established, then processing proceeds.

Once the communication link is established, processing varies with respect to the harvester 100 and the receiving vehicle 102. It will be noted that all processing can be performed on one vehicle or the other, or the processing can be performed on both vehicles or the processing can be distributed among the two vehicles and/or in a remote system as well. The separate types of processing performed with respect to the harvester 100 and that performed with respect to the receiving vehicle 102 are shown separately in FIG. 11 for the sake of example only. The processing with respect to harvester 100 will first be described.

Harvester speed processor 368 monitors the ground speed of harvester 100, as indicated by block 542. The ground speed may be monitored based upon an input from a speed sensor 220, based upon an input from position sensor 216, or in other ways as indicated by block 544. Harvester speed processor 368 determines whether there is a significant change in speed, as indicated by block 546. For instance, a significant change in speed may be that the speed has changed by a threshold amount (such as when vehicle 100 accelerates or decelerates rapidly, or come to a stop unexpectedly, etc.). If the speed has not changed significantly, then harvester heading processor 370 processes the harvester heading. The harvester heading can be based on inputs from position sensor 216, from a separate heading sensor 218, or in other ways. Monitoring the harvester heading is indicated by block 548. Harvester heading processor 370 determines whether there is a significant change in the harvester direction, as indicated by block 550. A significant change in direction may be determined when the harvester changes heading by a threshold number of degrees, or changes heading quickly, or in other ways. Assuming there is no significant change in the heading of harvester 102, then unloading system processor 374 monitors the unloading system, as indicated by block 552, to determine whether there is a failure (or malfunction) in the unloading system operation, as indicated by block 554. A failure (or malfunction) may be detected when the unloading auger stops working unexpectedly or is not working to a desired level, for example, or under other conditions. If there is no failure in the unloading system, then runtime clearance processor 363 can monitor the clearance around harvester 100 (e.g., vehicle-to-vehicle clearance, vehicle-to-environment clearance, etc.), as indicated by block 1542. Runtime clearance processing system 363 can determine whether the clearance around the harvester 100 is sufficient (e.g., whether collision will occur or is likely, relative to a threshold, etc.) for unloading, as indicated by block 1546. Runtime path processing system 365 can monitor the characteristics of the path, as indicated by block 1548. Runtime path processing system 365 can determine whether the path is suitable for unloading, as indicated by block 1550. It will be noted that the harvester speed, heading, unloading system operation, clearance as well as the path can be monitored simultaneously or in a given order. If there is an unloading system failure, as determined at block 554, or if there is a significant change in the direction of harvester 100, as indicated by block 550, or if there is a significant change in speed of harvester 100, or if the clearance is insufficient, as indicated by block 1546, or if the path is unsuitable, as indicated by block 1550, then processing continues at block 556 where output generator 364 generates a control output.

The output signal can be, for example, a propulsion and steering control signal as indicated by block 558. By way of example, assume that the harvester 100 has significantly changed speed, (e.g., harvester 100 stopped abruptly or slowed abruptly). In that case, the stop/avoidance output generator 382 may generate an output signal that is communicated to receiving vehicle 102 to control the propulsion subsystem 304 on receiving vehicle 102 to stop or slow and thus avoid a collision with the harvester 100. In another example, if the harvester 100 has changed its heading abruptly, meaning that harvested material may be accidentally dumped on the ground unless receiving vehicle 102 reacts quickly, then loading system control signal generator 384 can generate an output signal to control the unloading subsystem 252 to stop the unloading auger at least briefly, until the receiving vehicle 102 is back in a suitable unloading position relative to harvester 100. In another example, loading system control signal generator 384 may instead generate an output signal to control the unloading subsystem 252 to adjust the position of spout 118 to account for the change in heading of harvester 100. Generating a loading system control system is indicated by block 560 in the flow diagram of FIG. 11. In another example where harvester 100 has abruptly changed its heading, output generator 364 can generate a steering control signal that is output to control the steering subsystem 306 on receiving vehicle 102 so receiving vehicle 102 tracks along with harvester 100 so no grain is lost. The output can be generated to control a wide variety of other functionality on either harvester 100 or receiving vehicle 102, or both, as indicated by block 562 in FIG. 11. Thus, at block 556 either harvester 100 or receiving vehicle 102, or both, can be controlled based on the runtime monitoring of harvester 100. Processing continues, as indicated by block 564, until the breakthrough harvesting pass is complete.

With respect to receiving vehicle 102, receiving vehicle system 362 can use receiving vehicle speed processor 376 to monitor the receiving vehicle speed, as indicated by block 566. Receiving vehicle speed processor 376 can determine whether the receiving vehicle speed has changed significantly (e.g., relative to a threshold, relative to the speed of the harvester, etc.), as indicated by block 568. If not, receiving vehicle heading processor 378 can monitor the receiving vehicle heading, as indicated by block 570. Receiving vehicle heading processor 378 can determine whether the receiving vehicle heading has changed significantly (e.g., relative to a threshold, relative to the heading of the harvester, etc.), as indicated by block 572. Runtime clearance processing system 363 can monitor the clearance around receiving vehicle 102 (e.g., vehicle-to-vehicle clearance, vehicle-to-environment clearance, etc.), as indicated by block 1566. Runtime clearance processing system 363 can determine whether the clearance around receiving vehicle 102 is sufficient (e.g., whether collision will occur or is likely, relative to a threshold, etc.) for unloading, as indicated by block 1546. Runtime path processing system 365 can monitor the characteristics of the path, as indicated by block 1570. Runtime path processing system 365 can determine whether the path is suitable for unloading, as indicated by block 1572 It will be noted that the receiving vehicle heading, speed, and clearance, as well as the path can be monitored simultaneously or in a given order vehicle. If either the receiving vehicle speed or the receiving vehicle heading has changed significantly, or if the vehicle clearance is insufficient, or if the path is unsuitable, then output generator 364 can generate an output signal, as indicated by block 574. The output signal can be a propulsion/steering control signal that may be communicated to harvester 100 to control the propulsion or steering subsystems 248 and 250 accordingly, as indicated by block 576. An output signal can also be generated to control the propulsion and steering subsystems 304 and 306 on receiving vehicle 102. The output signal can be generated to control the unloading subsystem 252 (e.g., to control the swing position of spout 118 or the angle of spout 118), as indicated by block 578, or another output signal can be used to control other functionality, as indicated by block 580. By way of example, an output can be generated by synchronized control output generator 386 to control both vehicles 100 and 102 synchronously (such as to speed up, slow down, or stop, in synchronization with one another). Thus, it can be seen that at block 574 either harvester 100 or receiving vehicle 102, or both, can be controlled based on the runtime monitoring of receiving vehicle 102. This processing continues until the breakthrough pass unloading operation is complete, as indicated by block 576 in the flow diagram of FIG. 11.

It can thus be seen that the present description has described a system which enables an unloading operation during a breakthrough harvesting pass, where the receiving vehicle 102 drives in close enough proximity to the harvester 100 that the receiving vehicle is behind the header 114 and thus does not drive over any unharvested crop. Control systems are provided that determine whether, logistically speaking, the breakthrough harvesting pass is in a suitable location and whether the characteristics or properties of the path and of the vehicles themselves, indicate that the harvesting pass may be performed. Runtime monitoring and control is also performed to reduce the likelihood of any unwanted contact between the harvester and the receiving vehicle, or between either of the vehicles and objects in the vicinity of the vehicles. The vehicles are also controlled to avoid crop loss in the unloading operation.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, they can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 12:
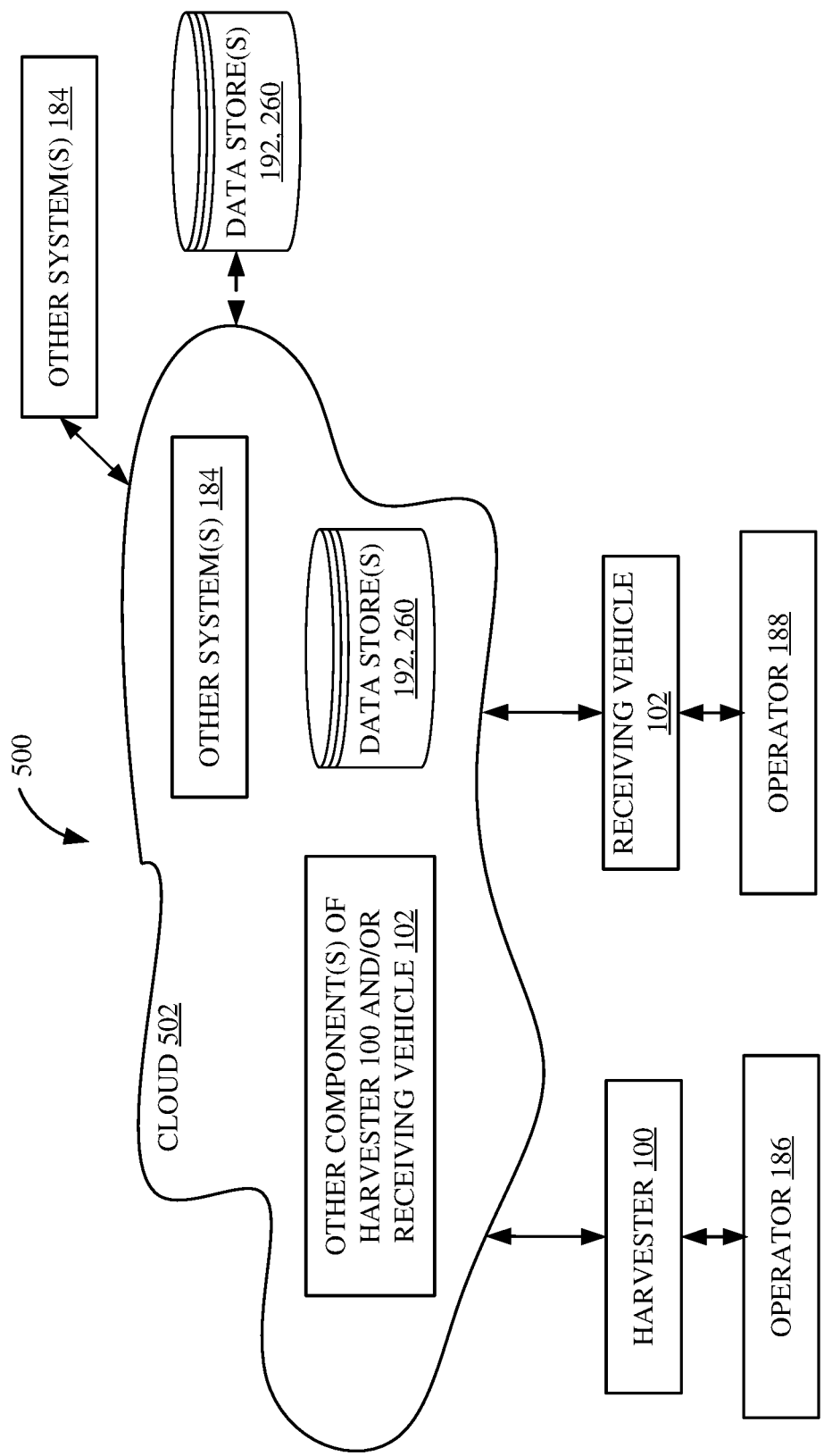
FIG. 12 is a block diagram showing one example of an agricultural system deployed in a remote server architecture.

FIG. 12 is a block diagram of system 90, shown in FIG. 4, except that some elements are in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 12, some items are similar to those shown in previous FIGS. and they are similarly numbered. FIG. 12 specifically shows that other systems 184, data stores 192 and 260 and other parts of systems 210/266 can be located at a remote server location 502. Therefore, harvester 100 and receiving vehicle 102 can access those systems through remote server location 502.

FIG. 12 also depicts another example of a remote server architecture. FIG. 12 shows that it is also contemplated that some elements of previous FIGS are disposed at remote server location 502 while others are not. By way of example, data stores 192, 260 or systems 184 can be disposed at a location separate from location 502, and accessed through the remote server at location 502. Regardless of where the items are located, they can be accessed directly by harvester 100 and receiving vehicle 102, through a network (either a wide area network or a local area network), the items can be hosted at a remote site by a service, or the items can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the harvester and/or receiving vehicle comes close to the fuel truck for fueling, the system automatically collects the information from the harvester and/or receiving vehicle using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester and/or receiving vehicle until the harvester and/or receiving vehicle enters a covered location. The harvester and/or receiving vehicle, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 13:
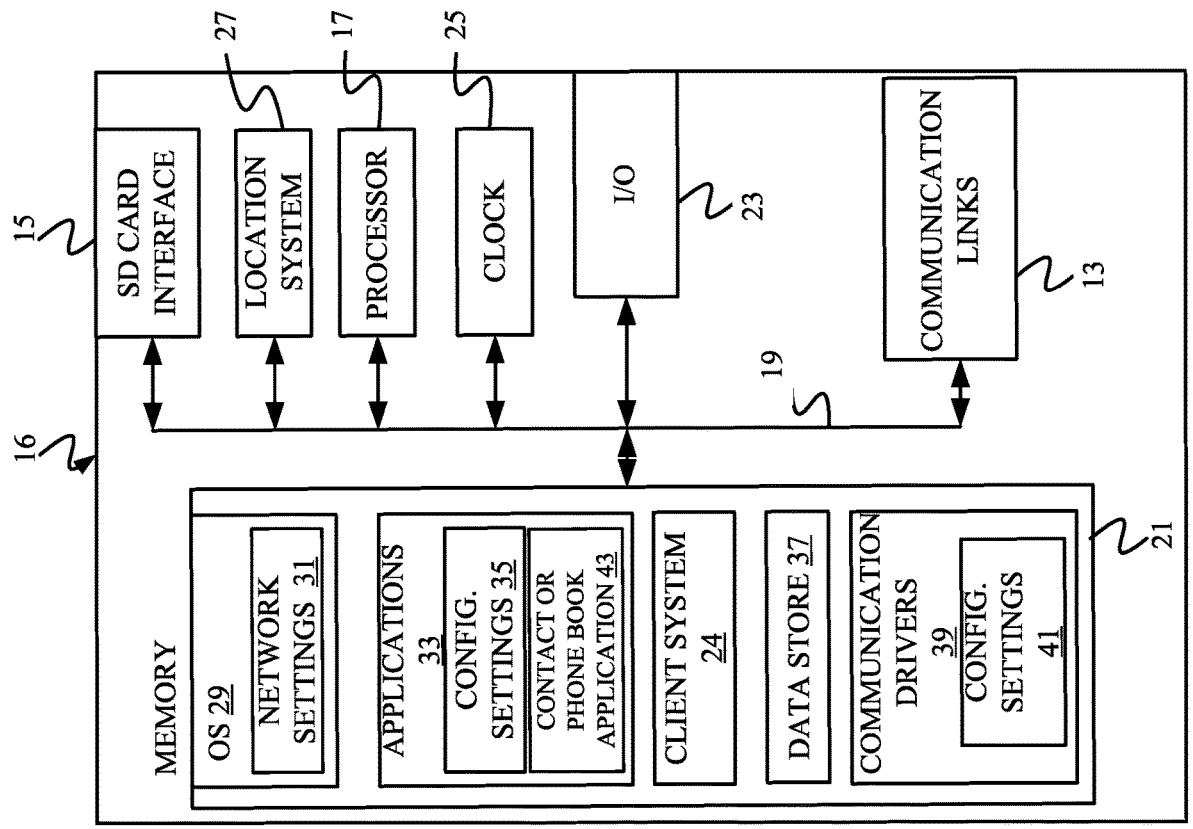
FIGS. 13, 14, and 15 show examples of mobile devices that can be used in systems and architectures.
Figure 14:
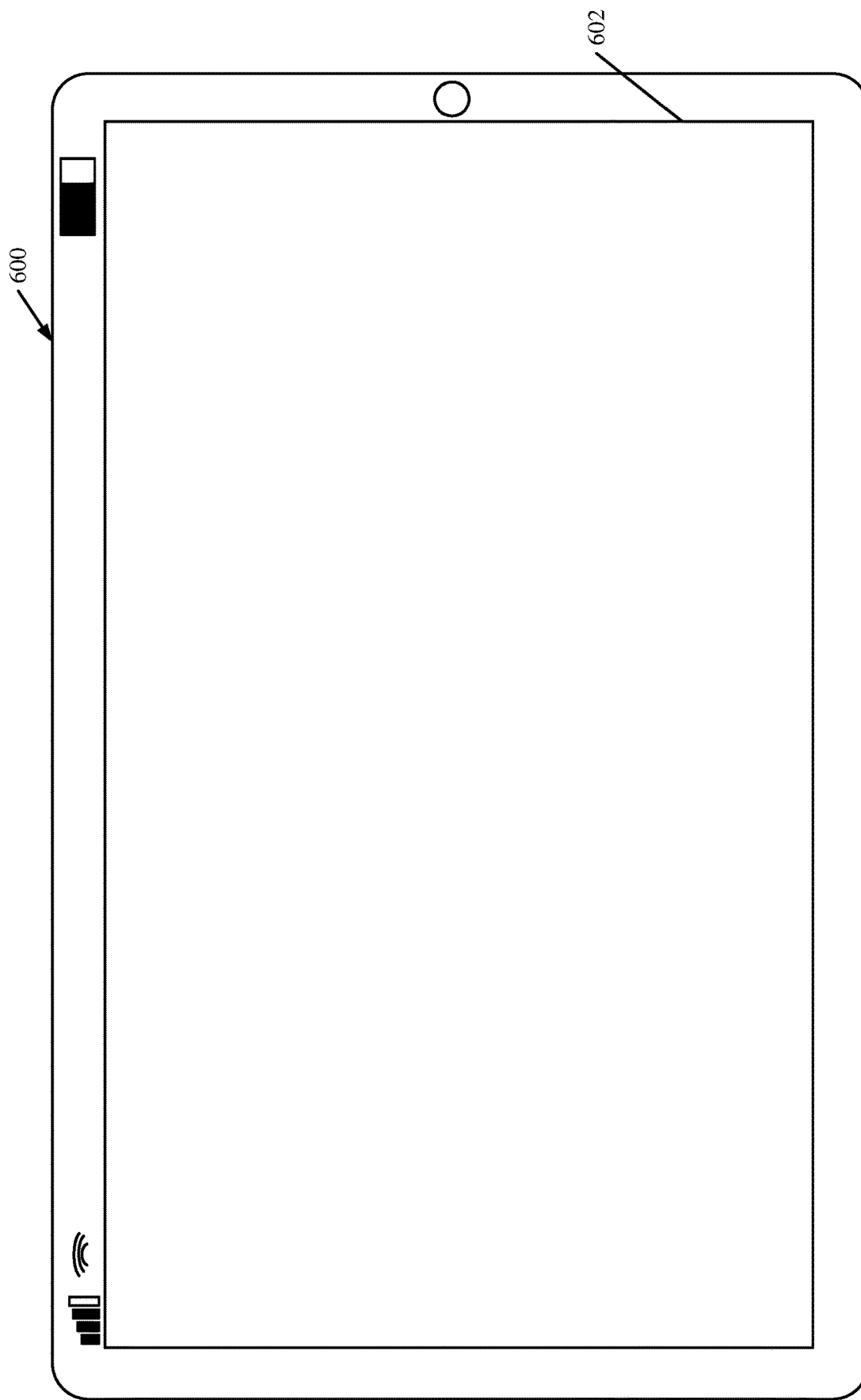
Figure 15:
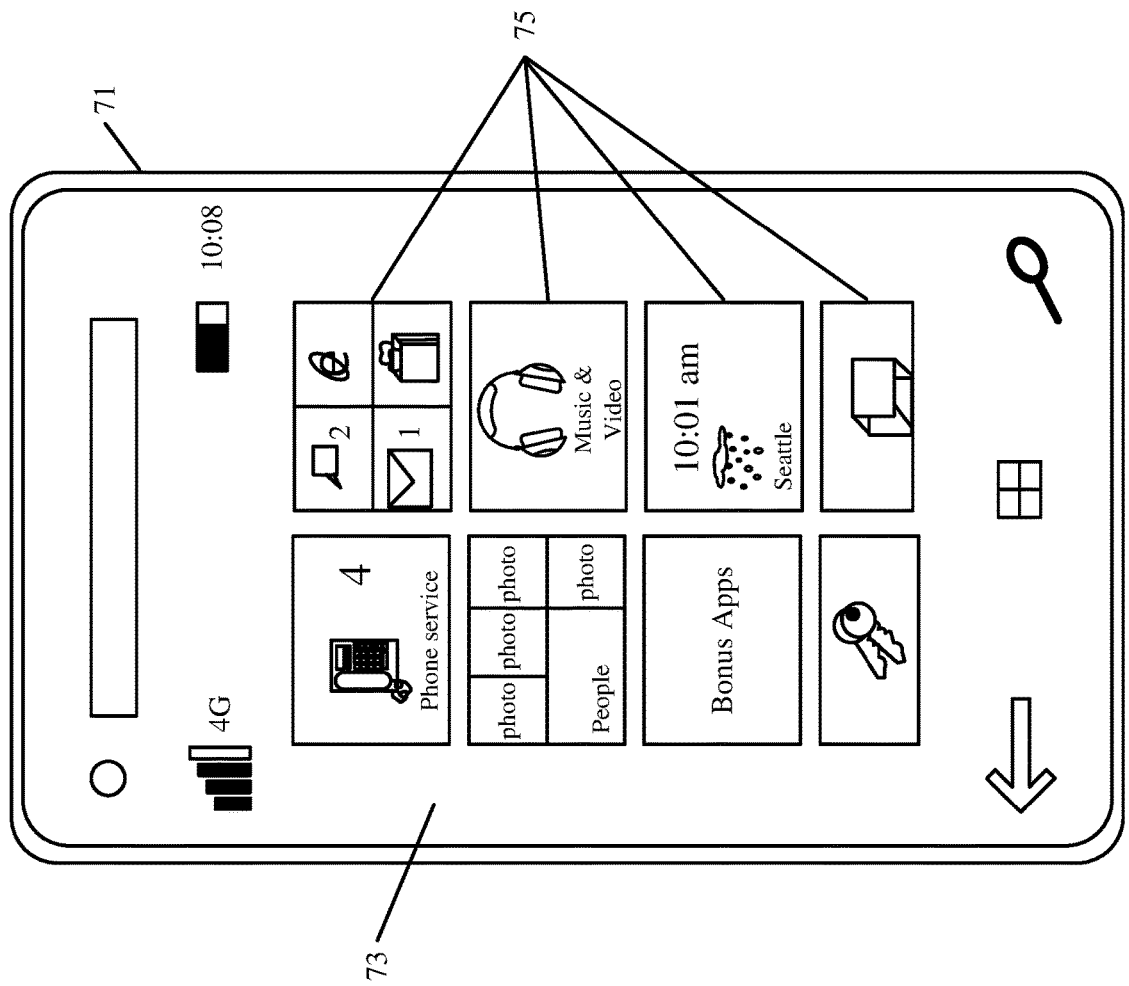

FIG. 13 is a simplified block diagram of one illustrative example of a handheld or mobile computing device that can be used as a user's or client's hand held device 16, in which the present system (or parts of it) can be deployed. For instance, a mobile device can be deployed in the operator compartment of harvester 100 and/or receiving vehicle 102 for use in generating, processing, or displaying the data. FIGS. 14-15 are examples of handheld or mobile devices.

FIG. 13 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 14 shows one example in which device 16 is a tablet computer 600. In FIG. 14, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 15 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 16:
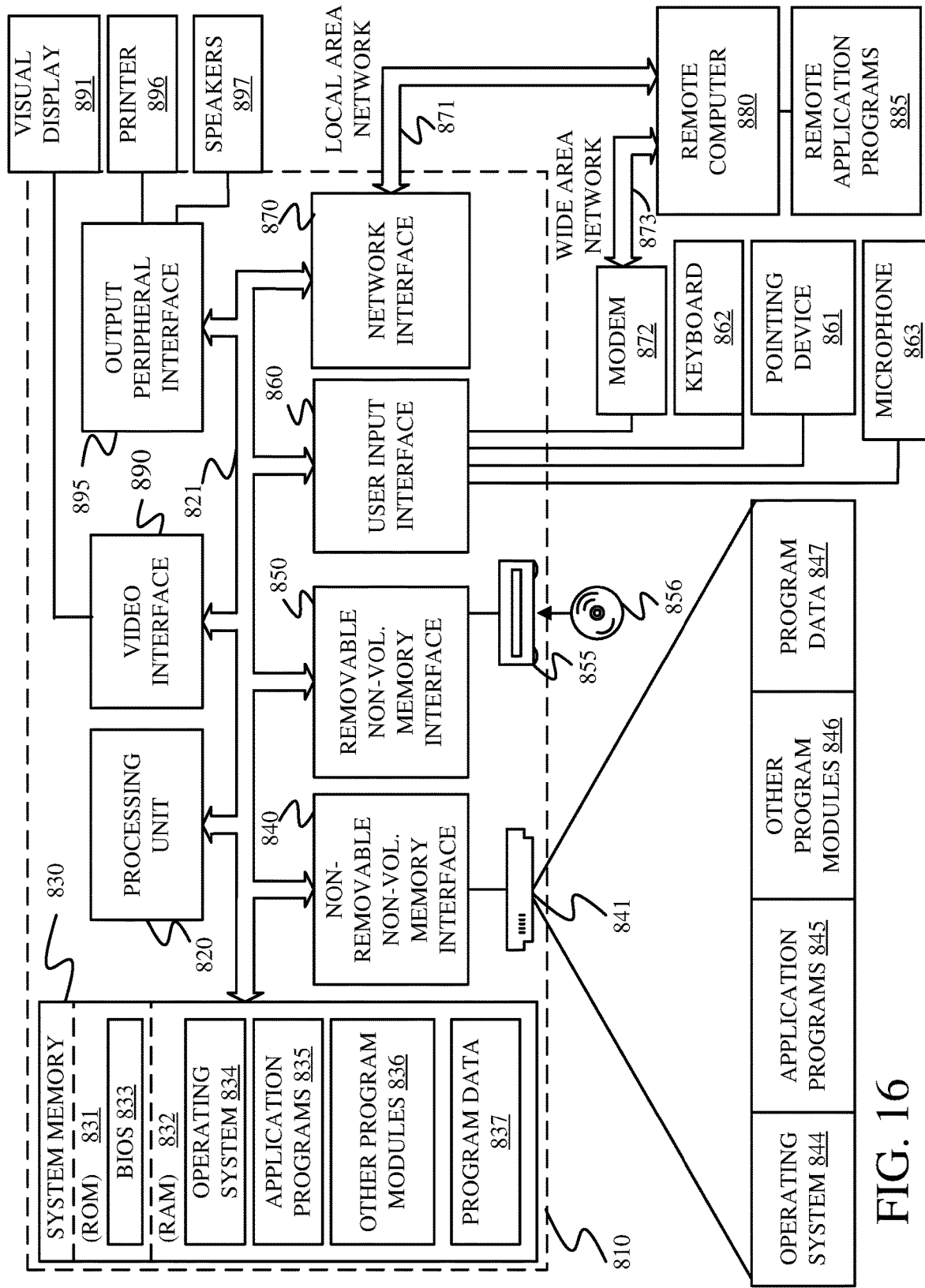
FIG. 16 shows one example of a computing environment.

FIG. 16 is one example of a computing environment in which elements of previous FIGS., or parts of them, (for example) can be deployed. With reference to FIG. 16, an example system for implementing some embodiments includes a general-purpose computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 16.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 16 illustrates operating system 834, application programs 835, other program modules 836, and program data 837.

The computer 810 may also include other removable/non-removable volatile/nonvolatile computer storage media. By way of example only, FIG. 16 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 16, provide storage of computer readable instructions, data structures, program modules and other data for the computer 810. In FIG. 16, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 16 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method, comprising:
    identifying a route of a breakthrough harvesting pass for a harvester in a field;
    generating, by a sensor, sensor data representing operation of the harvester in the field;
    identifying one or more route characteristics corresponding to the route based on the sensor data;
    generating a determination results indicating whether a path interlock condition is present in the route based on the one or more route characteristics; and
    programmatically controlling, by a machine control system, at least one of the harvester or a receiving vehicle based on the determination result.

2. The computer implemented method of claim 1, wherein,
    in response to the path interlock condition indicating that a path interlock does not exist, further comprising:
        detecting a speed of the harvester during the breakthrough harvesting pass or detecting a speed of the receiving vehicle during the breakthrough harvesting pass; and
        determining that a change in the speed of the harvester meets a speed change threshold or determining that a change in the speed of the receiving vehicle meets a speed change threshold; and
    programmatically controlling comprises generating a vehicle control signal to control one of the harvester or the receiving vehicle based on the speed of the harvester meeting the speed change threshold or based on the speed of the receiving vehicle meeting the speed change threshold.

3. The computer implemented method of claim 1, wherein,
    in response to the path interlock condition indicating that a path interlock does not exist, further comprising:
        detecting a heading of the harvester during the breakthrough harvesting pass or detecting a heading of the receiving vehicle during the breakthrough harvesting pass; and
        determining that a change in the heading of the harvester meets a heading change threshold or determining that a change in the heading of the receiving vehicle meets a heading change threshold; and
    programmatically controlling comprises generating a vehicle control signal to control one of the harvester or the receiving vehicle based on the change in the heading of the harvester meeting the heading change threshold or based on the change in the heading of the receiving vehicle meeting the heading change threshold.

4. The computer implemented method of claim 1, wherein,
    in response to the path interlock condition indicating that a path interlock does not exist, further comprising:
        detecting operation of an unloading subsystem of the harvester during the breakthrough harvesting pass; and
        determining whether the unloading subsystem is malfunctioning based on the operation of the unloading subsystem and generating an operating condition signal based on the determination; and
    programmatically controlling comprises generating a vehicle control signal to control one of the harvester or the receiving vehicle based on the operating condition signal.

5. The computer implemented method of claim 1 and further comprising:
    accessing a harvest plan indicative of how the harvester is to harvest the field;
    determining that the identified route of the breakthrough harvesting pass fails to meet a set of logistical criteria indicating presence of a logistics interlock condition; and
    generating a logistics output signal controlling one of the harvester or the receiving vehicle based on the logistics interlock condition.

6. The computer implemented method of claim 5, wherein determining that the identified route of the breakthrough harvesting pass fails to meet a set of logistical criteria comprises:
    identifying a fill level corresponding to the receiving vehicle; and
    determining that the receiving vehicle has insufficient remaining capacity to receive harvested material from the harvester throughout the breakthrough harvesting pass based on the fill level.

7. The computer implemented method of claim 6, wherein determining that the receiving vehicle has insufficient remaining capacity to receive harvested material from the harvester throughout the breakthrough harvesting pass based on the fill level comprises:
    obtaining an indication of dynamics of the receiving vehicle in the breakthrough harvesting pass;
    determining that the receiving vehicle has insufficient remaining capacity to receive harvested material from the harvester throughout the breakthrough harvesting pass based further on the indication of the dynamics of the receiving vehicle in the breakthrough harvesting pass.

8. The computer implemented method of claim 6, wherein determining that the receiving vehicle has insufficient remaining capacity to receive harvested material from the harvester throughout the breakthrough harvesting pass based on the fill level comprises:
obtaining an indication of yield in the breakthrough harvesting pass; and
identifying a header width corresponding to a header on the harvester; and
determining that a remaining capacity of the receiving vehicle is insufficient to receive harvested material from the harvester throughout the breakthrough harvesting pass based further on the indication of yield and the header width.

9. The computer implemented method of claim 1, wherein,
in response to the path interlock condition indicating that a path interlock does not exist, further comprising:
detecting dynamics of the harvester during the breakthrough harvesting pass or detecting dynamics of the receiving vehicle during the breakthrough harvesting pass;
determining that a change in the dynamics of the harvester meets a dynamics change threshold or determining that a change in the dynamics of the receiving vehicle meets a dynamics change threshold; and
programmatically controlling comprises generating a vehicle control signal to control one of the harvester or the receiving vehicle based on the change in the dynamics of the harvester meeting the dynamics change threshold or based on the change in the dynamics of the receiving vehicle meeting the dynamics change threshold.

10. The computer implemented method of claim 1 and further comprising:
detecting a clearance parameter indicative of clearance around the harvester and the receiving vehicle; and
detecting a clearance interlock condition based on the clearance parameter, wherein programmatically controlling the at least one of the harvester or the receiving vehicle comprises generating a vehicle control signal to control a controllable subsystem on the at least one of the harvester or the receiving vehicle based on the clearance interlock condition.

11. The computer implemented method of claim 10, wherein detecting a clearance parameter comprises at least one of:
detecting a clearance between the harvester and the receiving vehicle and detecting a clearance between the harvester and an object near the harvester and between the receiving vehicle and an object near the receiving vehicle,
detecting whether a door on the receiving vehicle is open, or
detecting spout position for an unloading spout on the harvester.

12. The computer implemented method of claim 1, wherein the sensor comprises at least one of:
a position sensor;
a proximity sensor;
a machine operation sensor;
a machine dynamics sensor;
a heading sensor;
a speed sensor;
a fill level sensor; or
a machine sensor.

13. The computer implemented method of claim 1, wherein programmatically controlling the at least one of the harvester or the receiving vehicle comprises at least one of:
controlling an operator interface subsystem to generate a message,
controlling an alert device to generate an alert, or
controlling the at least one of the harvester or the receiving vehicle to perform a remedial action.

14. The computer implemented method of claim 1, and comprising:
receiving an indication of the route; and
determining that the route comprises an initial path through crop in the field that is not adjacent to an already harvested path in the field.

15. The computer implemented method of claim 1, wherein identifying the one or more route characteristics corresponding to the route based on the sensor data comprises identifying the one or more route characteristics corresponding to the route based on map data.

16. An agricultural system, comprising:
at least one processor; and
a data store that stores computer executable instructions that, when executed by the at least one processor, configure the agricultural system to:
identify a route of a breakthrough harvesting pass for a harvester in a field;
generate, by a sensor, sensor data representing operation of the harvester in the field;
identify a set of route characteristics corresponding to the route based on the sensor data;
detect a path interlock condition based on the set of route characteristics;
based on a determination that the path interlock condition indicates presence of a path interlock, generate a locking output control signal; and
based on a determination that the path interlock condition indicates absence of a path interlock, generate a vehicle control signal to control at least one of the harvester or a receiving vehicle relative to the breakthrough harvesting pass.

17. The agricultural system of claim 16, wherein the computer executable instructions, when executed by the at least one processor, configure the agricultural system to:
access a harvest plan indicative of how the harvester is to harvest the field;
determine that the identified route of the breakthrough harvesting pass fails to meet a set of logistical criteria indicating presence of a logistics interlock condition; and
generate a logistics output signal controlling one of the harvester or the receiving vehicle based on the logistics interlock condition.

18. The agricultural system of claim 17, wherein the instructions configure the agricultural system to:
identify a fill level corresponding to the receiving vehicle;
determine that the identified route of the breakthrough harvesting pass fails to meet the set of logistical criteria based on a determination that the receiving vehicle has insufficient remaining capacity to receive harvested material from the harvester throughout the breakthrough harvesting pass based on the fill level.

19. The agricultural system of claim 16, wherein the instructions configure the agricultural system to:

in response to the path interlock condition indicating that a path interlock does not exist,
- detect an operational characteristic of the harvester or of the receiving vehicle during the breakthrough harvesting pass;
- determine that a change in the operational characteristic meets a change threshold; and
- generate the vehicle control signal to control one of the harvester or the receiving vehicle based on the change in the operational characteristic meeting the change threshold.

20. An agricultural machine, comprising:

at least one processor; and an interlock control system configured to identify a route of a breakthrough harvesting pass for a harvester in a field and to identify a set of route characteristics corresponding to the route;

a path processing system configured to detect a path interlock condition based on the set of route characteristics; and an interlock control signal generator configured to generate a vehicle control signal to control at least one of the harvester or a receiving vehicle based on the path interlock condition.

* * * * *